US009732194B2

(12) United States Patent
Lee et al.

(10) Patent No.: US 9,732,194 B2
(45) Date of Patent: Aug. 15, 2017

(54) GRAFT COPOLYMERS OF A POLY(VINYLIDENE FLUORIDE)-BASED POLYMER AND AT LEAST ONE TYPE OF ELECTRICALLY CONDUCTIVE POLYMER, AND METHODS FOR FORMING THE GRAFT COPOLYMERS

(71) Applicant: Nanyang Technological University, Singapore (SG)

(72) Inventors: Pooi See Lee, Singapore (SG); Vijay Kumar, Singapore (SG); Meng-Fang Lin, Singapore (SG)

(73) Assignee: Nanyang Technological University, Singapore (SG)

( * ) Notice: Subject to any disclaimer, the term of this patent is extended or adjusted under 35 U.S.C. 154(b) by 257 days.

(21) Appl. No.: 14/364,015

(22) PCT Filed: Dec. 7, 2012

(86) PCT No.: PCT/SG2012/000461
§ 371 (c)(1),
(2) Date: Jun. 9, 2014

(87) PCT Pub. No.: WO2013/085467
PCT Pub. Date: Jun. 13, 2013

(65) Prior Publication Data
US 2014/0367036 A1 Dec. 18, 2014

Related U.S. Application Data

(60) Provisional application No. 61/568,977, filed on Dec. 9, 2011.

(51) Int. Cl.
| | | |
|---|---|---|
| C08F 2/46 | (2006.01) | |
| C08G 61/04 | (2006.01) | |
| C08J 3/28 | (2006.01) | |
| H01G 4/30 | (2006.01) | |
| H01G 4/14 | (2006.01) | |
| C08F 214/22 | (2006.01) | |
| C08F 8/30 | (2006.01) | |
| C08G 73/02 | (2006.01) | |
| C08F 214/24 | (2006.01) | |
| C08G 81/02 | (2006.01) | |
| C09D 187/00 | (2006.01) | |
| H01B 3/30 | (2006.01) | |
| H01B 3/44 | (2006.01) | |
| C08G 83/00 | (2006.01) | |
| C08L 101/00 | (2006.01) | |

(52) U.S. Cl.
CPC ..... *C08J 3/28* (2013.01); *C08F 8/30* (2013.01); *C08F 214/22* (2013.01); *C08F 214/245* (2013.01); *C08G 73/0266* (2013.01); *C08G 81/024* (2013.01); *C08G 83/004* (2013.01); *C08L 101/005* (2013.01); *C09D 187/005* (2013.01); *H01B 3/303* (2013.01); *H01B 3/445* (2013.01); *H01G 4/14* (2013.01); *H01G 4/30* (2013.01); *H01G 4/306* (2013.01); *C08J 2327/16* (2013.01)

(58) Field of Classification Search
CPC ......... C08J 3/28; C08J 2327/16; H01B 3/445; H01B 3/303; H01G 4/306; H01G 4/30; H01G 4/14; C08G 73/0266; C08G 83/004; C08G 81/024; C08F 214/22; C08F 8/30; C08F 214/245; C08L 101/005; C09D 187/005
USPC .................. 522/126, 113, 1; 520/1
See application file for complete search history.

(56) References Cited

U.S. PATENT DOCUMENTS

2005/0049320 A1\* 3/2005 Yoshida ............ C08J 5/225
521/27
2011/0240556 A1\* 10/2011 Hoek ............... B01D 67/0011
210/650

OTHER PUBLICATIONS

Patil et al, Novel polyaniline/PVDF/BaTiO3 hybrid composites with high piezo-sensitivity, Jun. 2, 2007, Sensors and Actuators A, 138, 361-365.\*
Bhattacharya et al, Grafting: a versatile means to modify polymers Techniques, factors and applications, 2004, Prog. Polym. Sci, 29, 767-814.\*
Dargaville et al, High energy radiation grafting of fluoropolymers, 2003, Prog. Polym. Sci. 28, 1355-1376.\*
Ruckenstein et al, Surface modification and functionalization throug hteh self-assembled monolayer and graft polymerization, Advances in Colloid and Interface Science 113, 43-63.\*
Arbatti et al., "Ceramic-Polymer Composites with High Dielectric Constant," *Adv. Mater.* 19:1369-1372, 2007.
Bhattacharya et al., "Grafting: a versatile means to modify polymers—Techniques, factors and applications," *Prog. Polym. Sci.* 29:767-814, 2004.
Bobnar et al., "Enhanced dielectric response in all-organic polyaniline-poly(vinylidene fluoride-trifluoroethylene-chlorotrifluoroethylene) composite," *Journal of Non-Crystalline Solids* 353:205-209, 2007.

(Continued)

*Primary Examiner* — Jessica E Whiteley
(74) *Attorney, Agent, or Firm* — Seed IP Law Group LLP

(57) ABSTRACT

Methods for forming a graft copolymer of a poly(vinylidene fluoride)-based polymer and at least one type of electrically conductive polymer, wherein the electrically conductive polymer is grafted on the poly(vinylidene fluoride)-based polymer are provided. The methods comprise a) irradiating a poly(vinylidene fluoride)-based polymer with a stream of electrically charged particles; b) forming a solution comprising the irradiated poly(vinylidene fluoride)-based polymer, an electrically conductive monomer and an acid in a suitable solvent; and c) adding an oxidant to the solution to form the graft copolymer. Graft copolymers of a poly(vinylidene fluoride)-based polymer and at least one type of electrically conductive polymer, wherein the electrically conductive polymer is grafted on the poly(vinylidene fluoride)-based polymer, nanocomposite materials comprising the graft copolymer, and multilayer capacitors comprising the nanocomposite material are also provided.

15 Claims, 12 Drawing Sheets

(56) References Cited

OTHER PUBLICATIONS

Dang et al., "Fabrication and Dielectric Characterization of Advanced BaTiO$_3$/Polyimide Nanocomposite Films with High Thermal Stability," *Adv. Funct. Mater.* 18:1509-1517, 2008.

Dang et al., "Dielectric behavior of three-phase percolative Ni-BatiO$_3$/polyvinylidene fluoride composites," *Applied Physics Letters* 81(25):4814-4816, Dec. 16, 2002.

Dang et al., "Giant Dielectric Permittivities in Functionalized Carbon-Nanotube/Electroactive-Polymer Nanocomposites," *Adv. Mater.* 19:852-857, 2007.

Dang et al., "Influence of silane coupling agent on morphology and dielectric property in BaTiO$_3$/polyvinylidene fluoride composites," *Applied Physics Letters* 89, 112902, 2006, 4 pages.

Dang et al., "Novel Ferroelectric Polymer Composites with High Dielectric Constants," *Adv. Mater.* 15(19):1625-1629, Oct. 2, 2003.

Dargaville et al., "High energy radiation grafting of fluoropolymers," *Prog. Polym. Sci.* 28:1355-1376, 2003.

Dou et al., "Improved dielectric strength of barium titanate-polyvinylidene fluoride nanocomposite," *Applied Physics Letters* 95, 132904, 2009, 4 pages.

Forsythe et al., "The radiation chemistry of fluoropolymers," *Prog. Polym. Sci.* 25:101-136, 2000.

He et al., "Polymer/Ceramic Composite Hybrids Containing Multi-walled Carbon Nanotubes with High Dielectric Permittivity," *Current Nanoscience* 6:40-44, 2010.

Huang et al., "Fully Functionalized High-Dielectric-Constant Nanophase Polymers with High Electromechanical Response," *Adv. Mater.* 17:1153-1158, 2005.

Ihlefeld et al., "Copper Compatible Barium Titanate Thin Films for Embedded Passives," *Journal of Electroceramics* 14:95-102, 2005.

Kang et al., "Surface Modification of Fluoropolymers via Molecular Design," *Adv. Mater.* 12(20):1481-1494, Oct. 16, 2000.

Kim et al., "High Energy Density Nanocomposites Based on Surface-Modified BaTiO$_3$ and a Ferroelectric Polymer," *ACS NANO* 3(9):2581-2592, 2009.

Kim et al., "Phosphonic Acid-Modified Barium Titanate Polymer Nanocomposites with High Permittivity and Dielectric Strength," *Adv. Mater.* 19:1001-1005, 2007.

Li et al., "Electrical Energy Storage in Ferroelectric Polymer Nanocomposites Containing Surface-Functionalized BaTiO$_3$ Nanoparticles," *Chem. Mater.* 20:6304-6306, 2008.

Li et al., "Nanocomposites of Ferroelectric Polymers with TiO$_2$ Nanoparticles Exhibiting Significantly Enhanced Electrical Energy Density," *Adv. Mater.* 21:217-221, 2009.

Palaniappan et al., "Polyaniline materials by emulsion polymerization pathway," *Prog. Polym. Sci.* 33:732-758, 2008.

Patil et al., "Novel polyaniline/PVDF/BaTiO$_3$ hybrid composites with high piezo-sensitivity," *Sensors and Actuators A* 138:361-365, 2007.

Ruckenstein et al., "Surface modification and functionalization through the self-assembled monolayer and graft polymerization," *Advances in Colloid and Interface Science* 113:43-63, 2005.

Thakur et al., "Polystyrene grafted polyvinylidenefluoride copolymers with high capacitive performance," *Polym. Chem.* 2:2000-2009, 2011.

Thakur et al., "Poly(vinylidene fluoride)-graft-poly(2-hydroxyethyl methacrylate): a novel material for high energy density capacitors," *J. Mater. Chem.* 21:3751-3759, 2011.

Wan, Meixiang, *Conducting Polymers with Micro or Nanometer Structure*, Tsinghua University Press, Beijing, and Springer Verlag GmbH Berlin Heidelberg, 2008, Chapter 2, "Polyaniline as a Promising Conducting Polymer," pp. 16-46, 34 total pages.

Watts et al., "High Permittivity from Defective Multiwalled Carbon Nanotubes in the X-Brand," *Adv. Mater.* 15(7-8):600-603, Apr. 17, 2003.

Ying et al., "pH effect of coagulation bath on the characteristics of poly(acrylic acid)-grafted and poly(4-vinylpyridine)-grafted poly(vinylidene fluoride microfiltration membranes," *Journal of Colloid and Interface Science* 265:396-403, 2003.

Yuan et al., "Fabrication and dielectric properties of advanced high permittivity polyaniline/poly(vinylidene fluoride) nanohybrid films with high energy storage density," *J. Mater. Chem.* 20:2441-2447, 2010.

Zhang et al., "Giant Eletrostriction and Relaxor Ferroelectric Behavior in Electron-Irradiated Poly(vinylidene fluoride-trifluoroethylene) Coplymer," *Science* 280:2101-2104, Jun. 26, 1998.

\* cited by examiner (C)

(A)

(B)

(A)

(B)

(C)

(A)

(B)

(C)

(D)

(A)

(ii) (i)

(B)

(i) (ii)

GRAFT COPOLYMERS OF A POLY(VINYLIDENE FLUORIDE)-BASED POLYMER AND AT LEAST ONE TYPE OF ELECTRICALLY CONDUCTIVE POLYMER, AND METHODS FOR FORMING THE GRAFT COPOLYMERS

CROSS-REFERENCE TO RELATED APPLICATIONS

This application claims the benefit of priority of US provisional application No. 61/568,977 filed on 9 Dec. 2011, the content of which is incorporated herein by reference in its entirety for all purposes.

TECHNICAL FIELD

The invention relates to graft copolymers of a poly(vinylidene fluoride)-based polymer and at least one type of electrically conductive polymer, as well as methods to form the graft copolymer.

BACKGROUND

Capacitors are widely used in application areas, such as industrial appliances, medicine, automobiles, aircraft, space, power supply circuits, computers, power electronics, and energy storage. Of the myriad of applications, electronic components and energy storage devices, in particular, require the use of materials with high performance dielectric properties.

Electroactive polymers have shown promise for energy storage due to their excellent properties. Using poly(vinylidene fluoride) (PVDF) as an example, it is an electroactive thermoplastic polymer having excellent chemical resistance, good stability, high volume resistivity, low water absorption rate with potential pyroelectric, piezoelectric, and ferroelectric properties. Specifically, PVDF provides the best polymer ferroelectric property and the highest dielectric constant among all polymers. Notwithstanding the above, its dielectric constant is far lower than that of non-polymer counterpart such as dielectric ceramics. To qualify PVDF for use in high charge-storage capacitors or electrostriction system for artificial muscles, for example, there is a need to improve the dielectric constant of PVDF.

A number of methods have been used to improve the dielectric properties of PVDF. For example, the dielectric properties of PVDF may be improved by incorporating perovskite ceramic particles of high dielectric constants into the polymer. Although the dielectric constant of such polymer-ceramic composites has been found to be higher than that of pristine PVDF, polymers, unsatisfactory dielectric loss and low breakdown field strength of the composites have limited their application. Furthermore, high volume content of the ceramic fillers in the polymer contributes to a loss in flexibility, and lowers quality of the composites.

Apart from the use of perovskite ceramic particles, other additives such as metal particles and carbon nanotubes have been introduced into the polymers by physical blending. However, this approach suffers from drawbacks such as adverse excessive agglomeration of fillers due to the incompatibility of these fillers with the polymer matrix, which in turn leads to dielectric loss and reduction of breakdown field.

In view of the above, there is a need for a material with improved dielectric properties which addresses at least one of the above-mentioned problems.

SUMMARY OF THE INVENTION

In a first aspect, the invention refers to a method for forming a graft copolymer of a poly(vinylidene fluoride)-based polymer and at least one type of electrically conductive polymer, wherein the electrically conductive polymer is grafted on the poly(vinylidene fluoride)-based polymer. The method comprises
  a) irradiating a poly(vinylidene fluoride)-based polymer with a stream of electrically charged particles;
  b) forming a solution comprising the irradiated poly(vinylidene fluoride)-based polymer, an electrically conductive monomer and an acid in a suitable solvent; and
  c) adding an oxidant to the solution to form the graft copolymer.

In a second aspect, the invention refers to a graft copolymer of a poly(vinylidene fluoride)-based polymer and at least one type of electrically conductive polymer, wherein the electrically conductive polymer is grafted on the poly(vinylidene fluoride)-based polymer, formed by a method according to the first aspect.

In a third aspect, the invention refers to a graft copolymer of a poly(vinylidene fluoride)-based polymer and at least one type of electrically conductive polymer, wherein the electrically conductive polymer is grafted on the poly(vinylidene fluoride)-based polymer.

In a fourth aspect, the invention refers to a method for forming a nanocomposite material. The method comprises
  (a) dissolving the graft copolymer according to the second aspect or the third aspect in an organic solvent to form a solution of the graft copolymer;
  (b) coating the solution on a substrate; and
  (c) drying the solution-coated substrate to form a nanocomposite material on the substrate.

In a fifth aspect, the invention refers to a nanocomposite comprising the graft copolymer according to the second aspect or the third aspect, or formed by a method according to the fourth aspect.

In a sixth aspect, the invention refers to a method of forming a multilayer capacitor. The method comprising
  (a) coating a layer of a first metal on at least a portion of one surface of the nanocomposite material according to the fifth aspect;
  (b) arranging a plurality of the metal-coated nanocomposite material formed in (a) in a stack such that the metal-coated surfaces do not contact each other but face the same direction; and
  (c) coating a layer of a second metal on at least a portion of each of two external surfaces of the stack opposing each other and lateral to the external surface of the stack with the layers of first metal coated thereon to form the multilayer capacitor.

In a seventh aspect, the invention refers to a multilayer capacitor comprising a nanocomposite according to the fifth aspect, or formed by a method according to the sixth aspect.

BRIEF DESCRIPTION OF THE DRAWINGS

The invention will be better understood with reference to the detailed description when considered in conjunction with the non-limiting examples and the accompanying drawings, in which.

Figure 1:
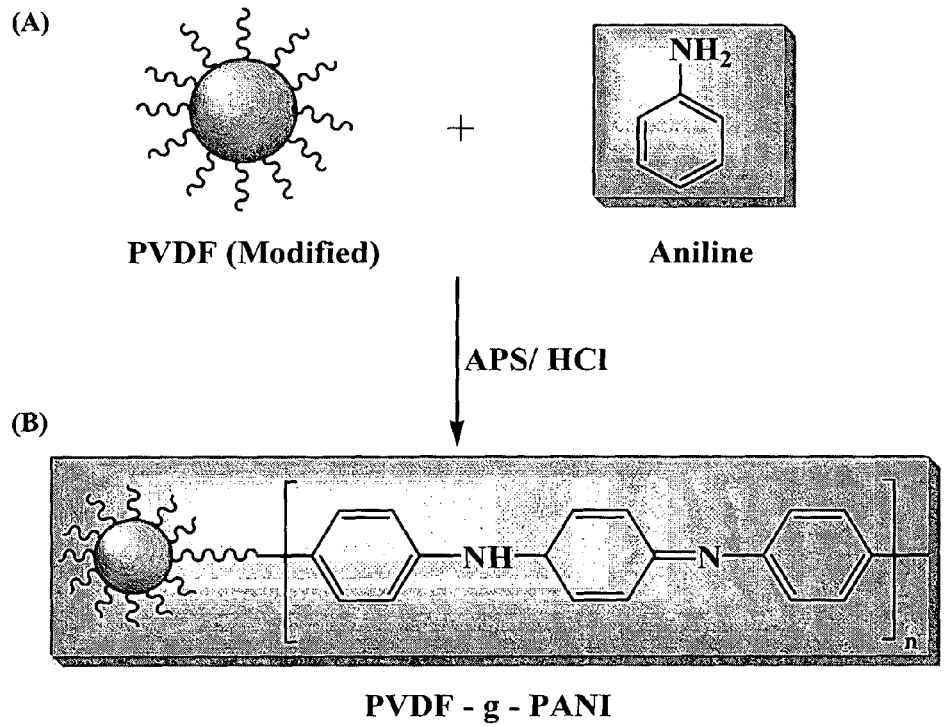
FIG. 1 is a schematic diagram depicting synthesis of poly(vinylidene fluoride) (PVDF)-graft-polyaniline (PANI) via oxidative radical polymerization according to various embodiments. In the embodiment shown in (A), PVDF is contacted with aniline in the presence of an oxidant such as ammonium persulfate (APS) and an acid such as hydrochloric acid (HCl) to form a graft copolymer of PVDF and polyaniline, as shown in (B).

This results in a low value of R as compared to $R_1$ and $R_2$.

DETAILED DESCRIPTION OF THE INVENTION

In a first aspect, the present invention refers to a method for forming a graft copolymer of a poly(vinylidene fluoride)-based polymer and at least one type of electrically conductive polymer, wherein the electrically conductive polymer is grafted on the poly(vinylidene fluoride)-based polymer.

The method of the first aspect offers a number of advantages such as improved compatibility of the electrically conductive polymers so formed with the poly(vinylidene fluoride)-based polymer matrix due to covalent bond formation between the electrically conductive polymers and the poly(vinylidene fluoride)-based polymer. Furthermore, a greater amount of electrically conductive monomerspolymers may be incorporated at different reactive sites on the poly(vinylidene fluoride)-based polymer. In so doing, a large number of nanocapacitors, in the form of arrays of rationally positioned nanocapacitors having improved dielectric properties, may be obtained. This is particularly advantageous since such arrays of rationally positioned nanocapacitors cannot be obtained using traditional blending methods. One reason for this is aggregation of electrically conductive polymers in nanocomposites that are prepared using traditional blending methods. The aggregated polymers form conductive paths which results in high leakage current in devices formed using the nanocomposites. By grafting the electrically conductive polymer on poly(vinylidene fluoride)-based polymer according to various embodiments of the invention, aggregation of the electrically conductive polymer in the nanocomposites is prevented. This translates into improved performance in the devices formed using the nanocomposites. Furthermore, early confrontation with percolation threshold may be avoided.

As used herein, the term "graft copolymer" refers to a copolymer having a backbone or main chain to which side chains of a different chemical composition are attached at various positions along the backbone. For example, the backbone may be formed of a first polymer and the side chains of a second polymer, wherein the first polymer and the second polymer have different chemical compositions. The side chains may be attached at various positions along the backbone by covalent bonding to form the graft copolymer.

In various embodiments, the backbone or the main chain of the graft copolymer is formed of a poly(vinylidene fluoride)-based polymer. Examples of poly(vinylidene fluoride)-based polymer include, but are not limited to, poly(vinylidene fluoride) (PVDF), poly(vinylidenefluoride-co-trifluoroethylene) (PVDF-TrFE), poly(vinylidene) flouride-hex afluoropropylene (PVDF-HEP), poly(vinylidene fluoride-chlorotrifluoroethylene) (PVDF-CTFE), poly(vinylidene fluoride-trifluoroethylene-chlorofluoroethylene) (PVDF-TrFE-CFE), derivatives thereof and mixtures thereof. In various embodiments, the poly(vinylidene fluoride)-based polymer comprises or consists essentially of poly(vinylidene fluoride).

The side chains are formed from at least one type of electrically conductive polymer. The term "electrically conductive polymer" refers to a polymer or an oligomer which is inherently or intrinsically capable of electrical conductivity. Besides electrically conductive polymers, the term "electrically conductive polymer" refers also to semi-conductive polymers. Examples of electrically conductive polymers include, but are not limited to, polyaniline, polypyrrole, polythiopene, polyacetylene, polypyrene, polyphenylene, and polyacene. Two or more electrically conductive polymers may be used to form the side chains of the graft copolymer. In various embodiments, the electrically conductive polymer comprises or consists essentially of polyaniline. In one embodiment, the electrically conductive polymer consists of polyaniline. The use of polyaniline is particularly advantageous, as it is chemically stable at room temperature conditions, and may be synthesized easily using chemical or electrochemical methods.

The electrically conductive polymer may be derived from an electrically conductive monomer by polymerization of the monomers, for example. In various embodiments, the electrically conductive polymer is derived from electrically conductive monomers selected from the group consisting of aniline, pyrrole, thiophene, bisthiophene, furan, para-phenylene, phenylene vinylene, para-phenylene sulfide, thienylene-vinylene, acetylene, indole, carbazole, imidazole, pyridine, pyrene, azulene, naphthalene, derivatives thereof, and mixtures thereof. In various embodiments, the electrically conductive polymer is derived from monomers comprising or consisting essentially of aniline.

The method of the first aspect includes irradiating a poly(vinylidene fluoride)-based polymer with a stream of electrically charged particles. As used herein, the term "electrically charged particles" refers to particles, molecules, ions or sub-atomic particles that carry an electric charge. Examples of electrically charged particles include, but are not limited to, positively and negatively charged particles, positively and negatively charged ions, electrons, and protons. In various embodiments, the electrically charged particles are electrons. Accordingly, the stream of electrically charged particles may be in the form of a high energy ionizing radiation, such as electron beam irradiation.

The stream of electrically charged particles should have sufficient energy to penetrate the mass of poly(vinylidene fluoride)-based polymer being irradiated to the extent specified. For example, the stream of electrically charged particles may be in the form of electrons beamed from an electron generator having an accelerating potential of 500 to 4,000 kilovolts. In various embodiments, ionizing radiation doses of about 0.1 to about 2 megarads ("Mrad"), such as about 1 to 2 Mrad, or about 1.6 Mrad are used. In various embodiments, irradiating the poly(vinylidene fluoride)-based polymer with a stream of electrically charged particles is carried out under vacuum.

The irradiation may be carried out to create active sites on the polymer backbone, which are then used to initiate graft polymerization of the electrically conductive monomer to produce graft copolymers. An exemplary embodiment is shown in FIG. 2(A), whereby a radical is formed in the molecule of PVDF by irradiating PVDF with a stream of electrically charged particles.

Besides using irradiation, chemical methods in which the polymer backbone is treated with organic chemical compounds capable of generating free radicals may also be used to generate active sites on the polymer backbone. For example, in the chemical method, an organic chemical compound capable of generating free radicals, such as a peroxide or azo compound, may be decomposed in the presence of the backbone polymer with formation of free radicals. The free radicals form the active grafting sites on the polymer, and initiate polymerization of the monomers at these sites. Even though chemical methods may also be used to generate the active sites on the poly(vinylidene fluoride)-based backbone, the use of irradiation to create the active sites is advantageous in that the graft copolymer has a higher grafting efficiency as compared with that prepared by chemical methods.

The irradiated poly(vinylidene fluoride)-based polymer may be exposed to oxygen to allow formation of peroxides and/or hydroperoxides on a surface of the polymer by reaction of the free radicals in the polymer with oxygen. Formation of the peroxides and/or hydroperoxides allows chemical-induced graft copolymerization of the electrically conductive monomers on the poly(vinylidene fluoride)-based polymer, of which an exemplary embodiment is shown in FIG. 2(B). Concentration of peroxide groups and/or hydroperoxides groups formed on the polymer may be controlled for example, by varying the irradiation dose, and/or the amount of oxygen to which the polymer is exposed after irradiation. On a similar note, the amount of time required for forming the peroxides and/or hydroperoxides may be determined by a person skilled in the art, and may depend, for example, on the amount of oxygen present, the irradiation dose, and the temperature.

In various embodiments, the irradiated poly(vinylidene fluoride)-based polymer may be exposed to oxygen by placing the polymer under atmospheric conditions for a time period of at least 30 minutes, such as 40 minutes, 50 minutes, or an hour. As used herein, the term "atmospheric conditions" means approximately 25° C. in atmospheric air containing approximately 21% oxygen by volume, with trace amounts of water vapor.

The method of the first aspect includes forming a solution comprising the irradiated poly(vinylidene fluoride)-based polymer, an electrically conductive monomer and an acid in a suitable solvent.

Examples of poly(vinylidene fluoride)-based polymer and electrically conductive monomers that may be used have already been described above. An acid may be added to adjust the pH of the solution. In various embodiments, the acid may be hydrochloric acid, sulfuric acid, dodecylbenzenesulfonic acid, naphthalene-2-sulfonic acid, poly(4-syyrenesufonic acid), or mixtures thereof. In some embodiments, the acid comprises or consists essentially of hydrochloric acid.

A solvent may be used in order to decrease the viscosity during processing and/or to facilitate polymerization by allowing stirring of the solution. Generally, the solvent may be any substance which is liquid, able to dissolve the irradiated poly(vinylidene fluoride)-based polymer and the electrically conductive monomer, and inert in that it does not react with the reactants and does not adversely affect the reaction. For example, the solvent may be an aqueous solution such as water, or an aqueous buffer solution such as saline. In various embodiments, the solvent comprises or consists essentially of distilled water.

To allow better mixing of the irradiated poly(vinylidene fluoride)-based polymer, electrically conductive monomer and acid in the solvent, the solution may be agitated, for example, by stirring or sonicating, and at a temperature that is suitable for increasing the rate at which the reactants dissolve in the solvent. In various embodiments, an inert gas such as nitrogen is purged into the solution to prevent oxidation of the reactants during grafting reaction.

The method of the first aspect further includes adding an oxidant to the solution to form the graft copolymer. To form the graft copolymer, the graft polymerization reaction may be a free radical polymerization reaction initiated by exposing the PVDF polymer backbone to an oxidant. Examples of oxidant include, but are not limited to, oxygen, air, $H_2O_2$ or metal oxides such as manganese oxide and vanadium oxide. In various embodiments, the oxidant is selected from the group consisting of ammonium peroxydisulfate (APS), potassium biiodate ($KH(IO_3)_2$), iron (III) chloride, and mixtures thereof. In various embodiments, the oxidant comprises or consists essentially of ammonium peroxydisulfate (APS). The oxidant may be added to the solution by dripping the oxidant in a drop wise fashion into the solution. In so doing, the rate of polymerization for forming the graft copolymer may be carried out in a controlled manner, and may translate into improvements in uniformity of the grafting reaction. The rate of polymerization for forming the graft copolymer may alternatively be controlled, for example, by using differing extents of agitation, and/or by controlling the temperature of the solution.

The method may further comprise blowing air into the solution to quench the polymerization reaction. By blowing air into the solution, the radicals of the polymers recombine with oxygen in the air to lose their functionality as initiation points of polymerization.

In various embodiments, the method may further include precipitating the graft copolymer formed with a reagent. For example, ethanol may be used to precipitate the graft copolymer. The precipitated polymer may be subjected to further purification steps to remove unwanted side products. For example, m-cresol, which is a good solvent for homopolymer of polyaniline, may be used to wash the graft copolymer so as to remove the polyaniline.

In further aspects, the invention refers to a graft copolymer of a poly(vinylidene fluoride)-based polymer and at least one type of electrically conductive polymer, wherein the electrically conductive polymer is grafted on the poly(vinylidene fluoride)-based polymer, which may be formed by the method according to the first aspect. Examples of an electrically conductive polymer that may be used have already been described above.

By grafting the electrically conductive polymer as side chains to the poly(vinylidene fluoride)-based polymer backbone, there is improved compatibility of the electrically conductive polymers with the poly(vinylidene fluoride)-based polymer matrix due to covalent bond formation.

In a fourth aspect, the invention refers to a method for forming a nanocomposite material. The method includes dissolving the graft copolymer according to the second aspect or the third aspect in an organic solvent to form a solution of the graft copolymer. Suitable organic solvents that may be used include N,N-dimethylformamide (DMF), N,N-dimethylacetamide (DMA), butanone, acetone, N-Methyl-2-pyrrolidone (NMP), tetrahydrofuran (THF), dimethyl sulfoxide (DMSO), and mixtures thereof.

The method includes coating the solution on a substrate. Generally, any thin film coating method may be used. Examples of thin film coating methods include, but are not limited to, chemical vapour deposition, sol gel deposition, spin coating, screen printing, tip coating, atomic layer deposition, roller coating, layer by layer coating, and pulsed laser deposition. In various embodiments, the solution is coated on the substrate by drop casting, spin coating, roller coating, layer by layer coating, or tape casting.

After coating the solution on the substrate, the solution-coated substrate is dried to form a nanocomposite material on the substrate. In drying the solution-coated substrate, at least some of the organic solvent that is used to dissolve the graft copolymer may be removed, leaving behind the nanocomposite material on the substrate.

Depending on the type of application for example, an additive may optionally be dissolved or dispersed in the solution prior to coating of the solution on the substrate. For example, to enhance the electrical conductivity of the nanocomposite formed, the additive may comprise an electrically conductive material, such as perovskite ceramic nanoparticles, metal nanoparticles and carbon nanotubes. The additive may also assume other shapes such as nanoflakes and nanosheets. To allow better mixing or dispersion of the additive in the solution, the solution may be agitated by stirring or sonicating, and in some embodiments, heated to increase the rate at which the additive dissolves in the solvent.

Thickness of the nanocomposite material layer may generally range from a few atomic layers or few monolayers, or from nanometers to a few micrometers. Typically, the thickness of the nanocomposite material layer ranges from about 5 nm to about 100 μm, such as about 5 nm to about 100 nm, about 100 nm to about 500 nm, about 1 μm to about 5 μm, about 10 μm to about 50 μm, or about 10 μm to about 100 μm.

The invention refers in a fifth aspect to a nanocomposite comprising the graft copolymer according to the second aspect or the third aspect, or formed by the method according to the fourth aspect. The nanocomposite may, for example, be used as a dielectric material in a capacitor.

Accordingly, in a sixth aspect, the invention refers to a method of forming a multilayer capacitor. The term "multilayer capacitor" may also be referred herein as a "multilayer polymer capacitor" (MLP). The method comprises coating a layer of a first metal on at least a portion of one surface of the nanocomposite material according to the fifth aspect; arranging a plurality of the metal-coated nanocomposite materials in a stack such that the metal-coated surfaces do not directly contact each other but face the same direction; and coating a layer of a second metal on at least a portion of each of two external surfaces of the stack opposing each other and lateral to the external surface of the stack having the layers of first metal coated thereon to form the multilayer capacitor. In other words, the plurality of nanocomposite materials are placed on top of each other in the same orientation, i.e. the metal-coated layer faces upward or downward, and at two opposing lateral or side walls relative to the external surface of the stack where the metal-coated layer is present, a layer of a second metal is deposited on at least a portion of the surface of each of the two opposing lateral walls of the stack.

The term "capacitor" refers generally to an electronic device or component that stores an electrical charge. Typically, a capacitor includes two conductive electrodes or plates separated by an insulator or a dielectric. Each of the two conductive electrodes stores an electrical charge at the surface of the electrode at the boundary with the dielectric, whereby the electrical charge at each electrode is opposite to that stored on the other electrode.

In its simplest form, a capacitor contains two conducting plates that sandwich an insulating medium. Such a capacitor configuration may also be referred to as a simple plate capacitor. The capacitance C of the capacitor may be calculated by the equation $$C = KeA/d$$

wherein K denotes the dielectric constant of the insulating medium; e denotes the permittivity of free space; A denotes the effective area common to the two conducting plates; and d denotes the distance separating the two plates.

In line with the above, to obtain a capacitor with high capacitance, the dielectric constant of the dielectric material and the effective area common to the two conducting plates should be high, while the distance separating the two plates i.e. thickness of the dielectric material should be small. In application therefore, when the number of layers of nanocomposite material in the stack increases, the effective area that is common to the conducting plates increases, thereby resulting in an increase in capacitance.

Figure 15:
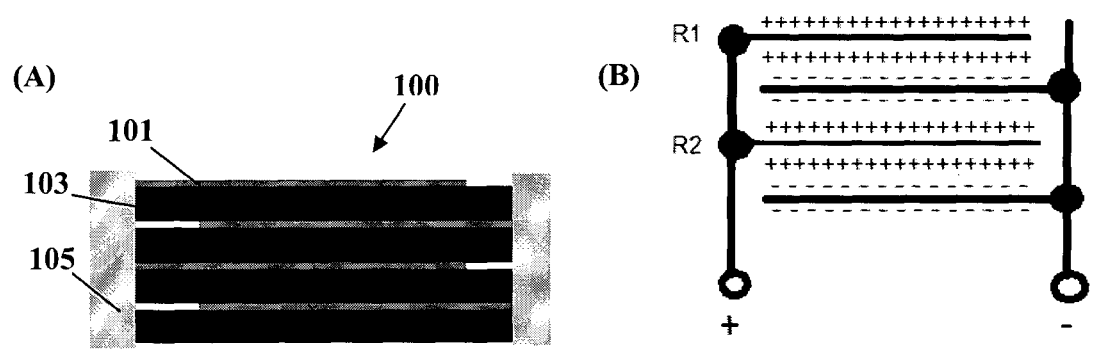
FIG. 15(A) a cross-sectional view of a multilayer capacitor 100 according to an embodiment of the sixth aspect. A layer of a first metal 101 is coated on at least a portion of a surface of the nanocomposite material 103. A plurality of the metal-coated nanocomposite material formed is arranged in a stack such that the metal-coated surfaces do not contact each other but face the same direction. Layers of a second metal 105 is coated on two external surfaces of the stack opposing each other and lateral to the external surface of the stack with the layers of first metal coated thereon to form the multilayer capacitor.
FIG. 15(B) is a schematic diagram depicting effective resistance R of the multilayer capacitor, which may be calculated using resistance of individual layers $R_1$ and $R_2$, and the equation $$\frac{1}{R} = \frac{1}{R_1} + \frac{1}{R_2}.$$

An example of a multilayer capacitor is depicted in FIG. 15, which is a cross-sectional view of a multilayer capacitor 100 according to an embodiment. A layer of a first metal 101 is coated on at least a portion of a surface of the nanocomposite material 103. A plurality of the metal-coated nanocomposite material formed is arranged in a stack such that the metal-coated surfaces do not contact each other but face the same direction. Layers of a second metal 105 is coated on two external surfaces of the stack, opposing each other and lateral to the external surface of the stack with the layers of first metal coated thereon to form the multilayer capacitor.

The number of layers of metal-coated nanocomposite material to form the capacitor may depend on the type of application hence the capacitance level required. In various embodiments, the number of layers of metal-coated nanocomposite material is at least two, such as three, four or five layers. In some embodiments, the number of metal-coated nanocomposite material is three or more. In one embodiment, the number of metal coated nanocomposite material is three.

Figure 12:
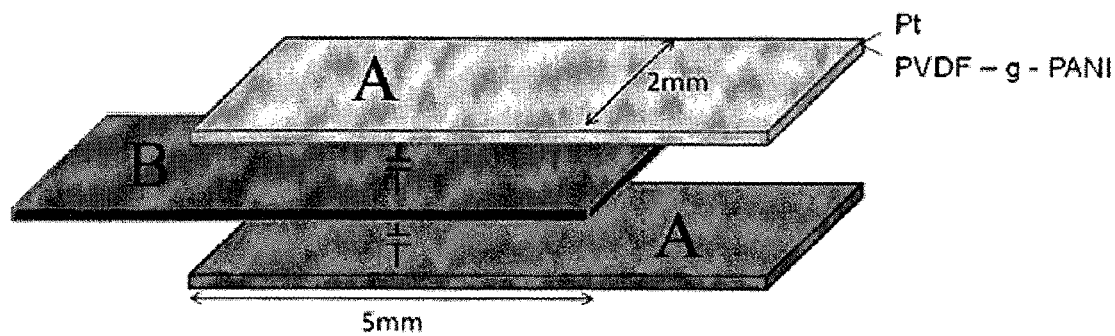
FIG. 12 is a schematic diagram of a 3-layered PVDF-g-PANI multilayer polymer (MLP) capacitor according to various embodiments.

In various embodiments, the nanocomposite material to be stacked may be prepared using a graft copolymer according to the second or the third aspect or hybrid layers formed from a mixture of polymer and nanocomposite, to reduce leakage current. An exemplary embodiment is shown in FIG. 12, where "A" denotes the graft copolymer layer and "B" denotes a hybrid layer.

The first metal and the second metal may be the same or different. In various embodiments, the first metal is selected from the group consisting of platinum, silver, gold, aluminium, nickel, copper, and alloys thereof. The second metal may be selected from the group consisting of platinum, silver, gold and alloys thereof.

The second metal may be coated on two external surfaces of the stack, in which the two external surfaces are opposing each other, and are lateral to the surfaces of the stack having the layers of first metal coated thereon. In some embodiments, the two external surfaces are at least substantially perpendicular to the surfaces of the stack having the layers of first metal coated thereon. The second metal may be formed on the external surfaces of the stack such that they are in electrical contact with the layers of first metal to form the multilayer capacitor. Each individual layer of the stack may be arranged at least substantially parallel to one another such as that shown in FIG. 15(A).

FIG. 15(B) is a schematic diagram depicting effective resistance R of the multilayer capacitor, which may be calculated using resistance of individual layers $R_1$ and $R_2$, and the equation $$\frac{1}{R} = \frac{1}{R_1} + \frac{1}{R_2}.$$

This results in a low value of R as compared to $R_1$ and $R_2$.

The second metal may be coated using any suitable thin film coating method. Examples of thin film coating method have already been mentioned above.

In a seventh aspect, the invention refers to a multilayer capacitor comprising the nanocomposite according to the fifth aspect, or formed by the method according to the sixth aspect.

The multilayer capacitor may include at least two nanocomposite layers. In various embodiments, the number of nanocomposite layers is three or more. As mentioned above, the presence of multilayers of the nanocomposite which function as dielectrics can substantially increase the dielectric strength of the capacitor, thereby enhancing the energy storage ability of the capacitor.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Advantages of graft copolymer formed herein include incorporation of an electrically conductive polymer such as polyaniline into a poly(vinylidene fluoride)-based polymer.

This allows covalent bonding of polyaniline to PVDF. The graft copolymer may be used to form multilayer polymer capacitor device for the benefit of high energy density capacitors. From the results obtained, it can be seen that there is significant improvement in terms of dielectric properties for high performance capacitors, which may be attributed to the following: (1) dipole density, which is characterized by the total number of dipoles per unit volume, and (2) the ability of the dipoles to follow the reversal of polarity with applied electrical field, i.e., the mobility of the dipole, which in turn depends upon the mobility of the charges on the polymer chains to which the dipoles are attached. The dielectric constant obtained in the PVDF-g-PANI copolymer is much higher than that in other polymer system reported thus far. In addition, discharge time of grafted polymer is much superior to that of bulk ceramic material.

Example 1: Materials

PVDF (M=420,000) pellets with a diameter of 0.1 mm used in this work were supplied by Solvay Solexis Inc. Conductive PANI monomer (aniline) was received from SigmaAldrich. Aniline was distilled prior to use and ammonium persulphate was used without further purification. Concentrated hydrochloric acid, m-cresol, acetone, N-Methylpyrrolidone (NMP) and methanol were supplied by (SigmaAldrich Chemie GmbH, Germany). Deionized water was used for all the reactions. All the materials mentioned above were purified whenever necessary.

Example 2: Preparation of Polymer Films

The PVDF and PVDF-g-PANI powders in the ratio 60 mg ml were dissolved homogeneously in the solvent of N, N-Dimethylformamide (DMF). The solution was stirred and heated at 60° C. simultaneously for twelve hours in order to have uniform mixing to form the film precursors. Subsequently, the PVDF PVDF-g-PANI films were tape casted onto glass substrate using the precursors and dried in air at 60° C. for twelve hours and in vacuum at 50° C. for twelve hours to remove DMF. The film thickness was measured using a micrometer accurate to 0.001 mm while the weight of the samples was measured using a laboratory scale accurate to 0.01 mg.

Example 3: Fabrication of Multilayer Capacitor

For testing the electrical properties, two types of capacitor were designed. Single layer parallel-plate capacitors were fabricated by using a sputter coater to deposit 50 nm thick Pt through an array of 1 $mm^2$ circular holes to form the top electrode, and on the other side of PVDF-g-PANI films to form the back electrode. A multilayer polymer (MLP) capacitor, comprising three layers of Pt sputter coated PVDF-g-PANI sheets was fabricated as shown in FIG. 12.

Example 4: Instrumentation

The dielectric properties of samples were measured using a Keithley 4200 semiconductor parameter analyzer and a HP4284 LCR meter in the frequency range of 100 Hz to 1 MHz at different temperatures. A high-voltage instrument (CS2674A) was used to measure the electrical breakdown strength. The voltage was applied continuously on the sample until it broke down.

Various samples of pristine PVDF and PVDF-g-PANI copolymers were characterized using Fourier transform infrared spectroscopy (FTIR), Thermogravimetric Analysis (TGA) and Differential Scanning calorimetry (DSC).

Example 5: Activation of PVDF Polymer Samples

PVDF powder samples after proper drying were placed in plastic bags and purged with nitrogen for ten minutes to remove oxygen prior to irradiation. The PVDF samples sealed in plastic bags were irradiated in vacuum using the Energy Sciences Inc. (ESI) Electron Beam Accelerator at room temperature (25° C.). The radiation dose of 1.6 Mrad was used at fixed speed of 18 MPM in order to have maximum exposure of radiation to the polymer. After irradiation, the irradiated samples were exposed to the atmosphere at room temperature (25° C.) for at least 30 minutes to facilitate the formation of surface peroxides and hydro peroxides for the subsequent chemical-induced graft copolymerization experiments.

Example 6: Chemical Synthesis of PVDF-Graft-Polyaniline Copolymers (PVDF-g-PANI)

FIG. 1 is a schematic diagram depicting synthesis of poly(vinylidene fluoride) (PVDF)-graft-polyaniline (PANI) via oxidative radical polymerization according to various embodiments.

Chemical induced graft copolymerization was carried out in a 500 mL tri-necked flask equipped with thermometer, condenser and magnetic stirrer with heating mantle. In a typical reaction, 0.5 g pre-irradiated PVDF (electron beam irradiation conditions, viz. the radiation dose, conveyer speed, and maximum accelerating voltage were fixed at 1.6 Mrad, 18 MPM, 175 kV respectively), aniline (0.1 mol/L) and hydrochloric acid (0.9 mol/L) were added in 50 mL of distilled water, and nitrogen was purged into the solution for thirty minutes. The mixture was thermo-stated at temperature of 55±5° C. under nitrogen ($N_2$) atmosphere. After thirty minutes, definite amount of 0.08 mol/L APS dissolved in 10 mL distilled water was added drop wise via a syringe through a rubber septum and this was taken as zero time.

The grafting reaction was carried out at known fixed temperature with magnetic stirring. After a further 5 hours of continuous stirring, the mixture became a green solution. At the end of reaction time, the reaction was arrested by blowing air into the reaction flask to freeze further reactions. The reaction mixture was then precipitated with absolute ethanol. The graft copolymers obtained were collected by filtration and thoroughly washed with distilled water and ethyl ether, followed by acetone for complete separation of ungrafted PANI from the grafted material.

In order to make sure that all the polyaniline homopolymer is removed; the grafted copolymer was washed several times with m-cresol (good solvent for homopolymer of polyaniline) followed by Soxhlet extraction in the m-cresol for 72 hours. Finally, the product was washed with 1 M HCl solution and dried at 40° C. for 24 hours under vacuum. The percentage grafting was calculated from increase in the weight of original polymer using the method reported earlier.

Example 7: Mechanism for Graft Copolymerization Synthesis

Grafting of aniline onto PVDF polymer is suggested to follow the mechanism of grafting vinyl monomers onto preirradiated fluoropolymers. Irradiation of PVDF under vacuum and subsequent exposure to atmospheric oxygen led to formation of surface oxides and peroxides, which played a significant role during peroxydisulfate initiated graft copolymerization of aniline.

Figure 2:
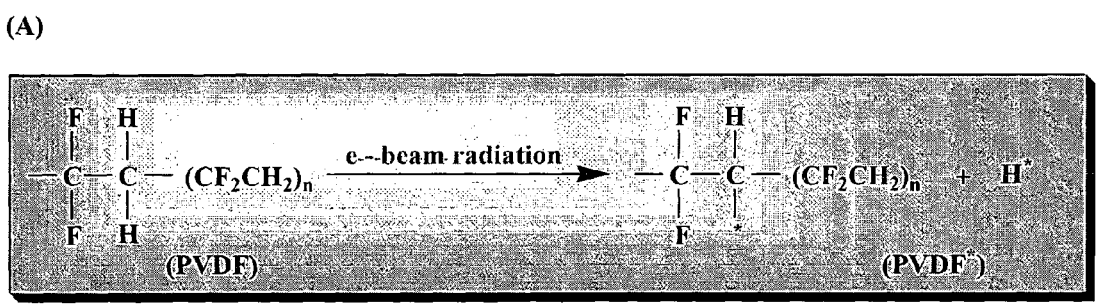
FIG. 2 is a schematic diagram depicting surface modification of PVDF polymer powder according to various embodiments. In the embodiment shown in (A), PVDF is irradiated with a stream of electrically charged particles such as electrons. As shown in (B), the irradiated PVDF polymer is exposed to oxygen to allow formation of peroxides on a surface of the polymer. In various embodiments, presence of moisture on the surface of the polymer and or in the atmosphere results in formation of hydroperoxides on the polymer surface, such as that shown in (C).
Figure 2:
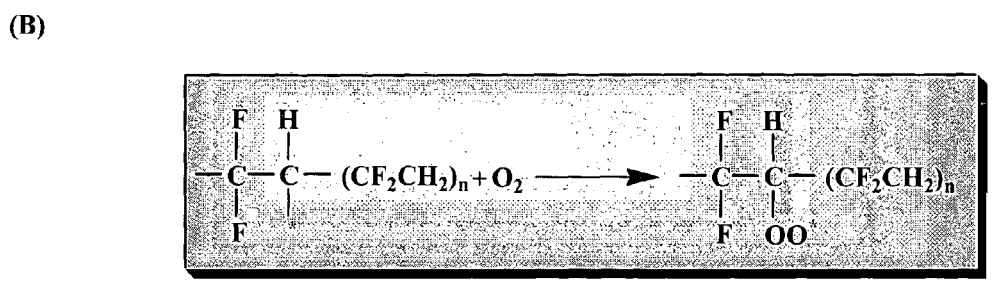
Figure 2:
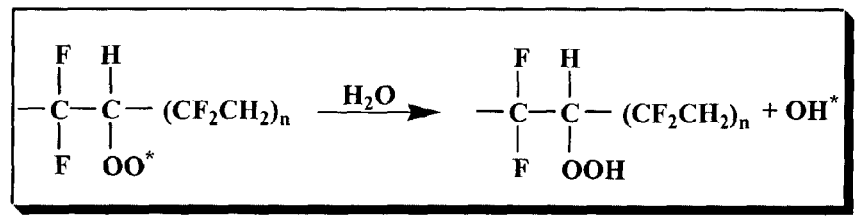

FIG. 2 is a schematic diagram depicting surface modification of PVDF polymer powder according to various embodiments. A chain mechanism is involved due to formation of sulfate ion radicals ($SO_4^-$.) which are ion chain carriers for the graft copolymerization onto various polymer systems.

Figure 3:
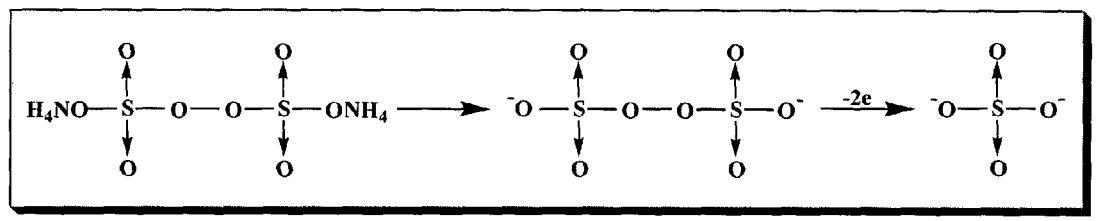
FIG. 3 is a schematic diagram depicting primary sulfate ion radical generation according to various embodiments. In (A), oxidizing action of APS is shown. In (B), APS acts as an initiator and primary sulfate ion radicals are generated.
Figure 3:
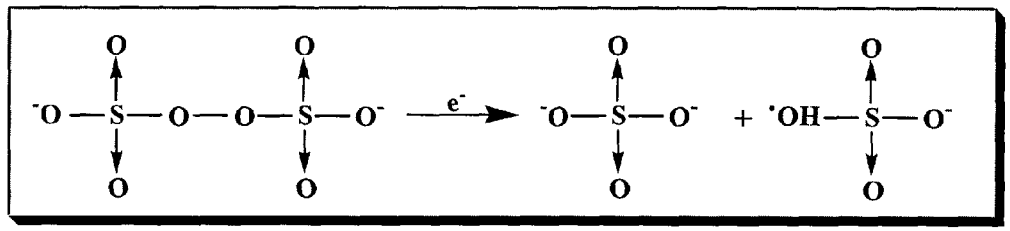
Figure 4:
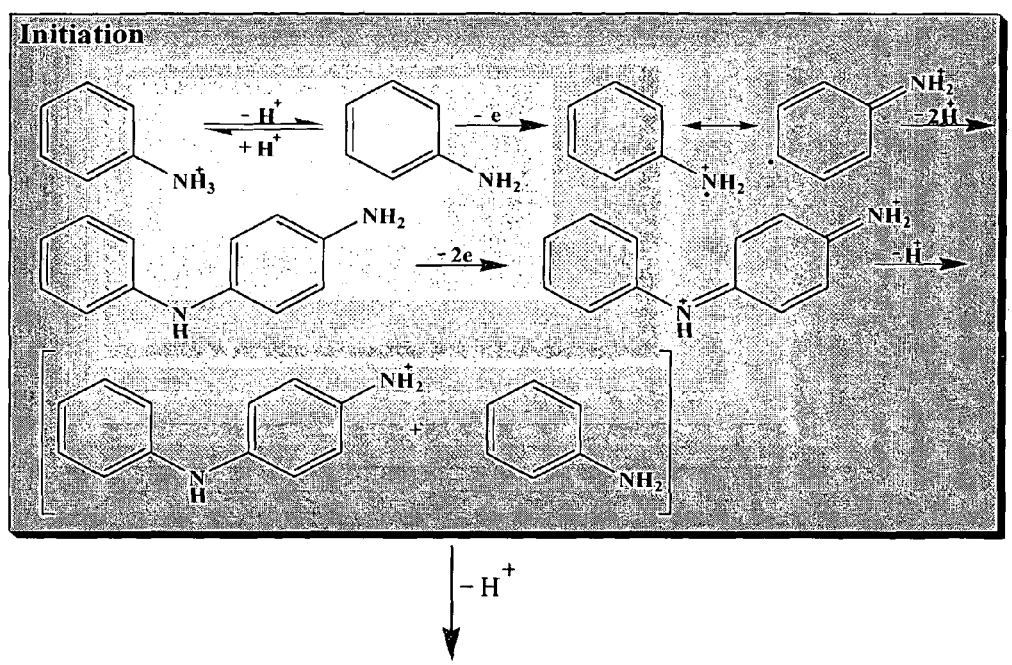
FIG. 4 is a schematic diagram depicting formation of secondary polyaniline ion radical (PANI*) according to various embodiments, where (A) initiation; (B) propagation; and (C) termination are shown.
Figure 4:
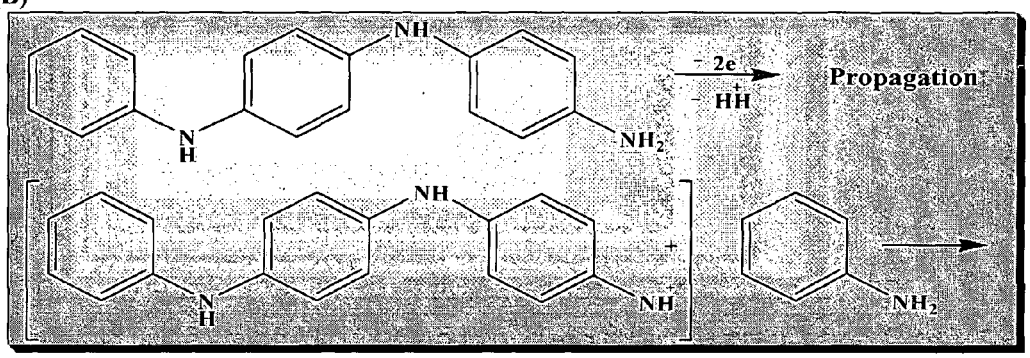
Figure 4:
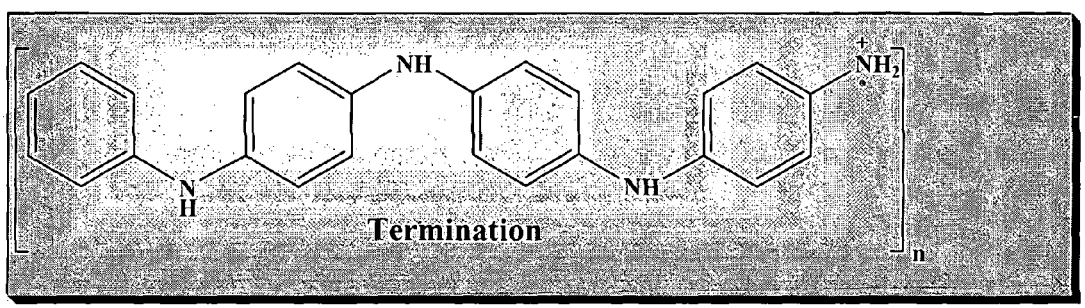
Figure 5:
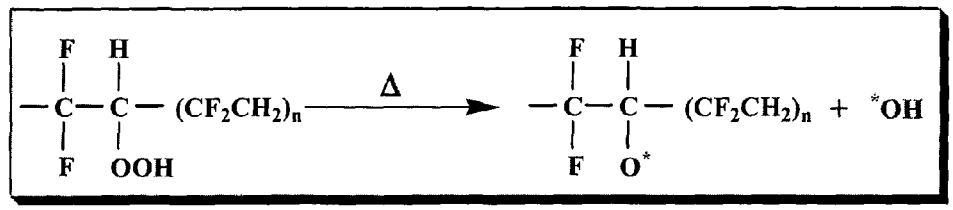
FIG. 5 is a schematic diagram depicting graft copolymerization of polyaniline (PANI) onto PVDF according to various embodiments. In (A), the irradiated PVDF generates radicals which react with secondary polyaniline ion radical (PANI*) as shown in (B). In (C), the polyaniline ion radical may react with another polyaniline ion radical to form a homopolymer as a side reaction. In (D), PVDF-g-PANI graft copolymer is formed.
Figure 5:
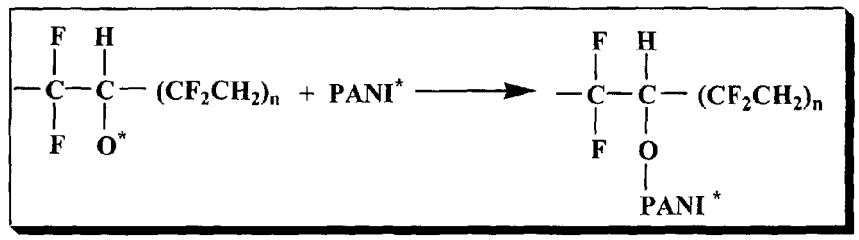
Figure 5:
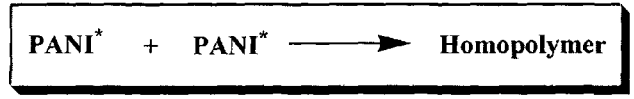
Figure 5:
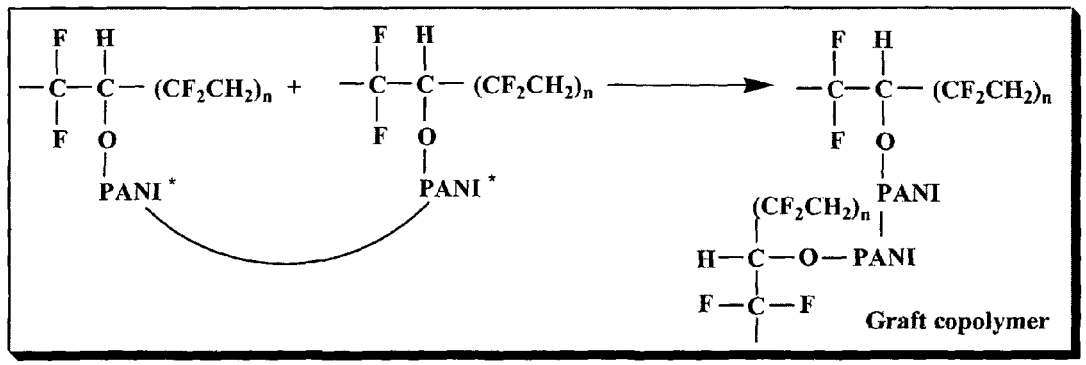

As shown in FIG. 3, sulfate ion radicals ($SO_4^-$.) are the primary radicals generated from the ammonium persulfate (APS) by the reduction of one electron. Simultaneously, APS generates $SO_4^{-2}$ ions by the reduction of two electrons and acts as an oxidant. They initiate the oxidative polymerization reaction of aniline via a medium of cationic radicals and form PANI and PANI radicals, as shown in FIG. 4. Lastly, PVDF macro radicals and PANI cation radicals combine to form PVDF-g-PANI graft copolymer, as shown in FIG. 5.

Figure 6:
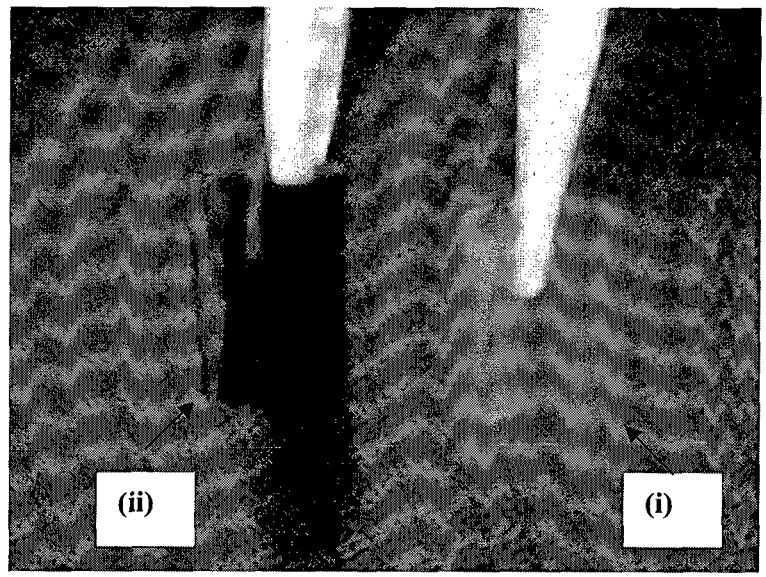
FIGS. 6 (A) and (B) are photographs of (i) pristine PVDF (White) and (ii) PVDF-g-PANI copolymer film.
Figure 6:
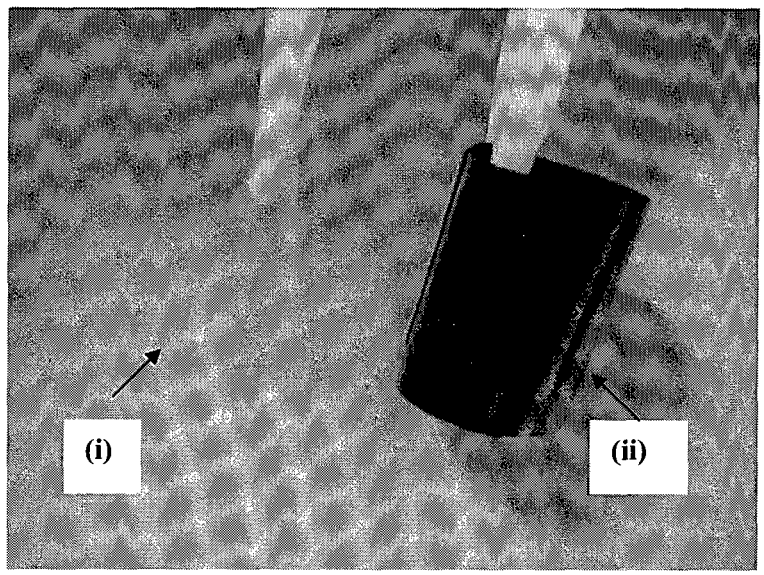

FIG. 6 shows the photographic images of 20-30 μm of pristine and polyaniline grafted (PVDF-g-PANI) films. It is clearly visible that both the films are flexible with ease of handling for different applications.

Example 8: Optimization of Graft Copolymerization Synthesis Conditions

To optimize the conditions for grafting of PANI onto the preirradiated PVDF, ammonium persulfate hydrochloric acid aniline monomer reaction temperature and reaction time were varied keeping total volume of the reaction mixture fixed at 50 ml. It was observed that $(NH_4)_2S_2O_8$/hydrochloric acid system may be efficiently used in the graft copolymerization of polyaniline on to PVDF, where maximum 11.35% grafting was achieved. Optimum conditions for maximum percentage of grafting (11.35%) used were: HCl concentration=0.9 mol/L; monomer concentration=0.1 mol/L; temperature=55° C.; time=5 hrs; initiator concentration=0.08 mol/L (see Table 1).

Example 9: Characterization of PVDF-g-PANI

The pristine PVDF and PVDF-g-PANI samples were characterized by Fourier Transform Infrared Spectroscopy (FTIR), Thermogravimetric Analysis (TGA) and Differential Scanning calorimetry (DSC) analysis. The results clearly demonstrate that polyaniline was successfully grafted into PVDF polymer.

Example 9.1: FTIR Spectral Study

Figure 7:
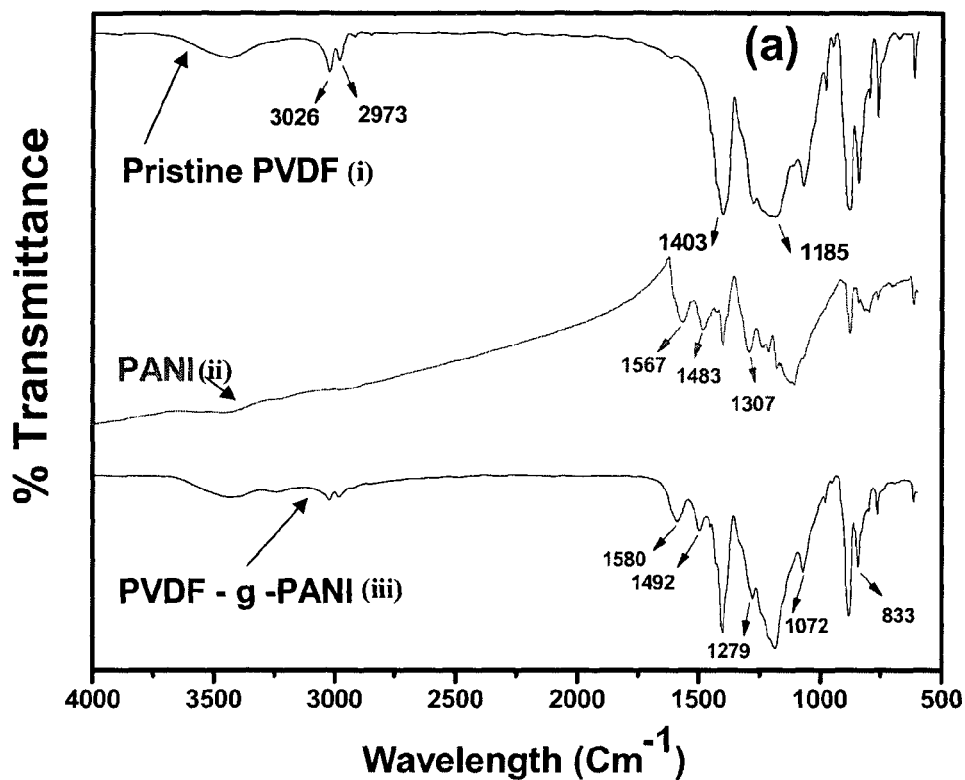
FIG. 7 shows (A) Fourier Transform Infra-red (FTIR) spectra of (i) pristine PVDF, (ii) polyaniline, and (iii) PVDF-g-PANI polymer powder; (B) TGA thermograms of (i) pristine PVDF, (ii) polyaniline, and (iii) PVDF-g-PANI polymer powder; and (C) DSC analysis of (i) pristine PVDF, (ii) polyaniline, and (iii) PVDF-g-PANI polymer powder.
Figure 7:
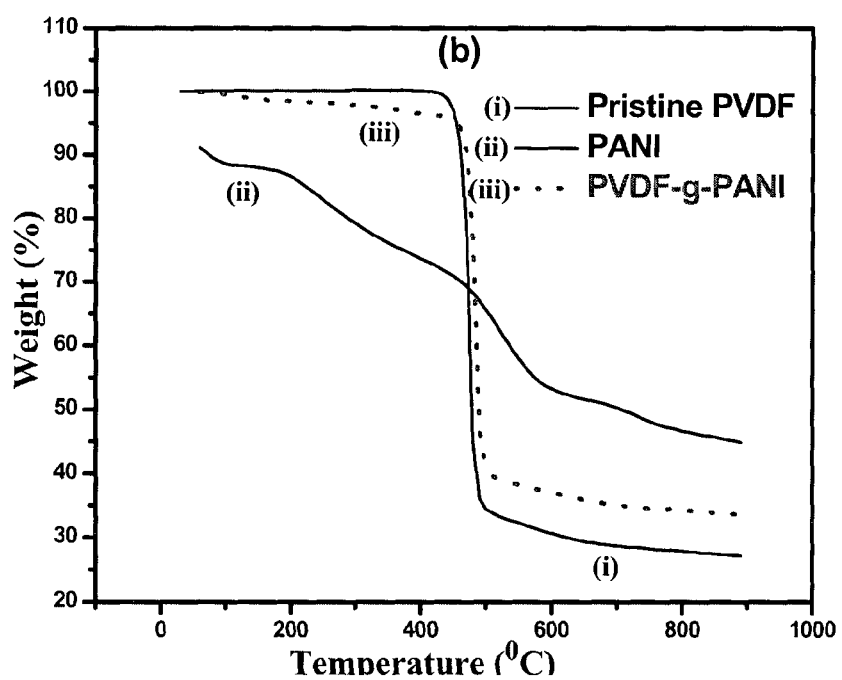
Figure 7:
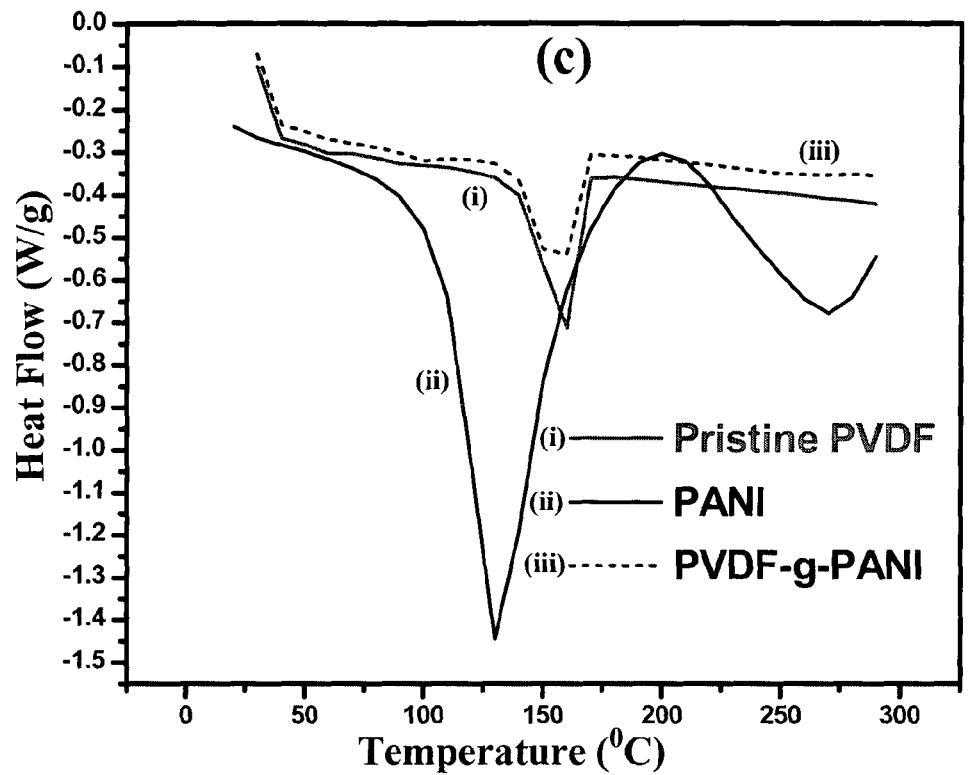

The FTIR spectra of pristine PVDF, PANI homo polymer and PVDF-g-PANI are shown in FIG. 7(a). In the spectrum of pristine PVDF polymer, the characteristic peaks in the base polymer were those near to $v_{max}$ 3000 cm$^{-1}$ representing C—H stretching vibration. The characteristic absorption bands at $v_{max}$ 1185 cm$^{-1}$ and $v_{max}$ 1403 cm$^{-1}$ were due to the absorption peaks of $CF_2$ stretching and $CH_2$ stretching modes respectively. The asymmetric and symmetric stretching vibrations of the $CH_2$ group in the pristine PVDF are located, respectively, at $v_{max}$ 3026 cm$^{-1}$ and $v_{max}$ 2973 cm$^{-1}$. The FTIR spectrum of the PVDF grafted PANI exhibited strong absorption throughout the range 4000-500 cm$^{-1}$. The FTIR spectrum shows peaks at $v_{max}$ 1580 and $v_{max}$ 1492 cm$^{-1}$ corresponding to an aromatic benzenoid and quinoid ring. The peaks observed at $v_{max}$ 1279 cm$^{-1}$ indicate the C—N stretching vibration of aromatic secondary amine. The peak corresponding to the N=O=N bending vibration of PANI shifted to lower wave number ($v_{max}$ 1072 cm$^{-1}$ from $v_{max}$ 1108 cm$^{-1}$). The shift can be attributed to the hydrogen bonding between PVDF and imine group of the grafted PANI chains. The peak at $v_{max}$ 833 cm$^{-1}$ may be attributed due to the aromatic C—H bending vibration band due to 1,4-disubstituted benzene ring. Other peaks observed in the spectrum corresponded to the vibration spectrum of PVDF backbone polymer.

For comparison, the FTIR spectrum of the PANI homo polymer was also taken. The peaks at $v_{max}$ 1483 and $v_{max}$ 1567 cm$^{-1}$ indicate the presence of ring stretch of benzenoid and quinoid form. The presence of dopants, Cl$^-$ peak is evident from the peak at 1307 cm$^{-1}$. The peak appearing at

TABLE 1

Optimization of various reaction parameters for maximum percentage graft copolymerization of aniline onto PVDF polymer powder

| S/No. | HCl concentration mol/L | Temperature (° C.) | Time (Hrs) | Monomer mol/L × 10$^{-2}$ | Initiator concentration mol/L | % Grafting |
|---|---|---|---|---|---|---|
| 1. | 0.3 | 40 | 4 | 0.05 | 0.04 | 1.4 |
| 2. | 0.6 | 40 | 4 | 0.05 | 0.04 | 2.3 |
| 3. | 0.9 | 40 | 4 | 0.05 | 0.04 | 3.6 |
| 4. | 1.2 | 40 | 4 | 0.05 | 0.04 | 3.3 |
| 5. | 0.9 | 35 | 4 | 0.05 | 0.04 | 3.5 |
| 6. | 0.9 | 45 | 4 | 0.05 | 0.04 | 4.4 |
| 7. | 0.9 | 55 | 4 | 0.05 | 0.04 | 5.2 |
| 8. | 0.9 | 65 | 4 | 0.05 | 0.04 | 4.9 |
| 9. | 0.9 | 55 | 3 | 0.05 | 0.04 | 4.2 |
| 10. | 0.9 | 55 | 4 | 0.05 | 0.04 | 5.5 |
| 11. | 0.9 | 55 | 5 | 0.05 | 0.04 | 6.4 |
| 12. | 0.9 | 55 | 6 | 0.05 | 0.04 | 6.4 |
| 13. | 0.9 | 55 | 5 | 0.075 | 0.04 | 7.1 |
| 14. | 0.9 | 55 | 5 | 0.1 | 0.04 | 7.7 |
| 15. | 0.9 | 55 | 5 | 0.125 | 0.04 | 7.6 |
| 16. | 0.9 | 55 | 5 | 0.1 | 0.02 | 4.5 |
| 17. | 0.9 | 55 | 5 | 0.1 | 0.04 | 7.4 |
| 18. | 0.9 | 55 | 5 | 0.1 | 0.08 | 11.35 |
| 19. | 0.9 | 55 | 5 | 0.1 | 0.12 | 10.85 |

1252 cm$^{-1}$ is due to the C—H stretch of aromatic secondary amine. The peak at 815 cm cm$^{-1}$ is due to para linked benzene ring. The peaks at 887 and 772 cm$^{-1}$ are due to the aromatic out of plane C—H bending stretch. These assignments are in close agreement with the earlier reports of FTIR studies of PANI. The FTIR study of the grafted polymer hence adds evidence for the successful chemical grafting of PANI onto PVDF.

Example 9.2: Thermal Analysis

The thermal stability of PVDF-g-PANI was determined by thermogravimetric analysis (TGA) taking pristine PVDF as reference. The TGA curves of PVDF-g PANI, pristine PVDF and polyaniline homopolymer are shown in FIG. 7(b).

TGA study indicated that the pristine PVDF was stable up to about 400° C. and the decomposition of the pristine PVDF onset at 437° C. and suffered a weight loss of less than 5% at about 455° C. This behaviour may be attributed to the degradation of the pristine PVDF matrix. PVDF showed maximum weight loss (around 70%) in the temperature range 450-600° C. after which it decreased slowly. Thermal study of PVDF-g-PANI showed that the copolymer decomposition onset at 91° C. with 62% weight loss up to 600° C.

The initial mass loss (5%) between 50 and 450° C. in PVDF-g-PANI was due to the loss of water and solvent in the polymer chains. In the TGA profile, the weight loss at the higher temperature indicated a structural decomposition of the polymer. A weight loss of about 63-66% was observed in the temperature range 600-900° C. for the grafted copolymer. In case of homopolymer PANI, three stages of weight loss were observed. The first weight loss around 14% was observed up to 200° C. which may be attributed to the loss of bound and adhered water; a second weight loss of 30% followed up to 450° C. The third weight loss started at 467° C. and about 47% weight was lost up to 600° C., after this point, it degraded slowly. A total loss of 64% was observed up to 900° C. These results indicated that polyaniline was successfully grafted onto PVDF and exhibited intermediate weight loss behaviour in comparison to that of pristine PVDF and PANI.

Example 9.3: Differential Scanning Calorimetry

The DSC curves of the pristine PVDF powder, PVDF-g-PANI and PANI are shown in FIG. 7(c). The melting point ($T_m$) of pristine PVDF was found to be 157.34° C. with the melting enthalpy ($\Delta H_m$) 39.91 J/g. For PVDF-g-PANI the melting point ($T_m$) was found to be 155.80° C. with the melting enthalpy ($\Delta H_m$) 33.23 J/g. For polyaniline homopolymer the melting point ($T_m$) and the melting enthalpy ($\Delta H_m$) were found to be 131.35° C. and 262.6 J/g respectively.

The percentage crystallinity ($X_C$) of the pristine PVDF and the PVDF-g-PANI were calculated from the heat of fusion and were found to be 38.11 and 34.79 respectively. The graft copolymerization of PVDF with polyaniline resulted in some obliteration in the structural symmetry of PVDF ensuing in the lowering of percentage crystallinity. It was postulated that the introduction of polyaniline graft-chains diluted the crystalline zone of the PVDF matrix and this phenomenon was probably associated with the decreasing proportion of the PVDF crystalline phase in the grafted polymer, possibly indicating the interception of polyaniline grafts into the crystalizable part of the PVDF melt.

Example 10: Electrical and Dielectric Properties Measurements

Example 10.1: Electrical Properties Measurement

Figure 8:
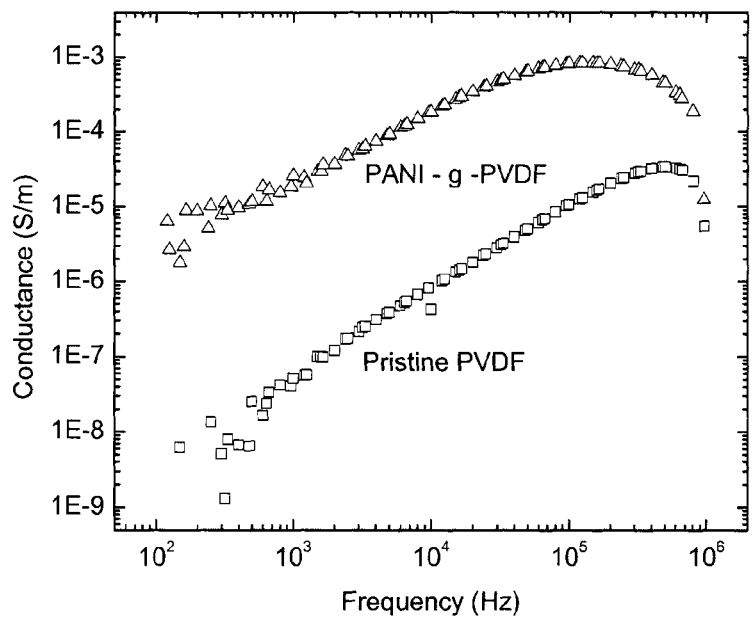
FIG. 8 is a graph showing electrical conductivity of pristine PVDF and PVDF-g-PANI films.

The electrical conductivity of synthesized graft copolymer films (material with optimum percentage of grafting) was measured with reference to pristine PVDF. FIG. 8 shows the frequency dependencies of conductivity of the PVDF-g-PANI copolymer film. The conductance of the pristine PVDF samples increased with frequency which was characteristic of non-conductive materials. The conductivity of PVDF-g-PANI film was almost frequency independent at low frequencies (<1 KHz). This frequency independence was characteristic of conductive materials, and was believed to be a result of the grafting of polyaniline. This higher conductivity was likely due to the incorporation of PANI grafts which increased the formation of elongated and connected PANI domains within the grafted network.

Example 10.2: Dielectric Properties Measurement

The dielectric behavior of pristine PVDF films and PVDF-g-PANI copolymer films was studied at different temperatures and the results were analyzed in terms of different parameters such as dielectric constant ($\in$), dielectric loss tangent and breakdown strength.

Both dielectric constant and loss depend upon two factors: (1) dipole density, which is characterized by the total number of dipoles per unit volume, and (2) the ability of the dipoles to follow the reversal of polarity with applied electrical field, i.e., the mobility of the dipole, which in turn depends upon the mobility of the charges on the polymer chains to which the dipoles are attached.

Like most polymers, PVDF is not electrically conductive. On the other hand, PANI represents a class of quasi-one-dimensional disordered conductors consisting of bundles of well coupled chains. This is opposed to conventional quasi one-dimensional conductors which have isolated chains. Within the bundles of well coupled chains, the electron is three dimensionally delocalized. The dielectric constants of PVDF homopolymer and PVDF-g-PANI copolymer were determined by measuring the capacitance (C). The dielectric constant was evaluated from the capacitance measurement using Equation (1)

$$\in = Cd/\in_0 A \qquad \text{Equation (1)}$$

where C is the capacitance with an isotropic material filling the space, $\in_0$ is the permittivity of free space which is equal to $8.85 \times 10^{-12}$ f/m, A is the cross sectional area of the sample, and d is its thickness.

FIG. 9(a) shows the dielectric constant of pristine PVDF and PVDF-g-PANI as a function of frequency at room temperature. For pristine PVDF, the dielectric constant decreased with increasing frequency. This may be attributed to the tendency of dipoles in the PVDF molecules to orient themselves in the direction of the applied field in the low frequency range. However, at higher frequencies, the dipoles are not able to respond to the rapidly changing direction of the applied field which causes the value of E to decrease.

On the contrary, the $\in$ values of PVDF-g-PANI copolymer (optimized grafting 11.35%) reduce rapidly over the whole range of frequency (up to $10^6$ Hz) as compared to pristine PVDF. Most noteworthy, as evident from FIG. 9(a), the dielectric constant of the grafted polymer is significantly larger in comparison with the pristine polymer. At 1 kHz, the dielectric constant of PVDF-g-PANI film reaches about 1235, representing more than 100 times increment as compared to pristine PVDF film. The dielectric constant of the PVDF-g-PANI film is mainly enhanced by the aniline monomer. The graft copolymerization synthesis reaction results in the incorporation of the conductive conjugated aniline polymer. This incorporation conjures the formation of nanocapacitors within the PVDF-g-PANI film. These nanocapacitors, which are impregnated throughout the PVDF-g-PANI film, may be understood as regions of conductive aniline which surround regions of insulating PVDF, thereby forming capacitor structures which contribute to the overall capacitance of the film.

Dielectric constant has been found to increase with increase in grafting (FIG. 9(b)) and this behaviour can be attributed to incorporation of more conducting polyaniline into the pristine PVDF. With the incorporation of more polyaniline as a result of increasing percentage grafting, more microcapacitors to nanocapacitors are formed contributing to the enhanced dielectric constant. It has been observed that the dielectric constant increases with percentage grafting up to the highest grafting percentage of 11.35%. It is interesting to note that even at 11.35% polyaniline grafting, there was no sharp increase in the dielectric constant or dielectric loss tangent, indicating the percolation threshold was still not achieved. In addition, the conductivity measured (in FIG. 8) was relatively low at about $2 \times 10^{-5}$ S/m. These results confirm that the polyaniline critical concentration had not been reached, eluding the formation of percolative paths, preventing a leaky conductive film.

The frequency dependences of the loss tangent for the pristine PVDF and PVDF-g-PANI film samples are presented in FIG. 10(a). Albeit a higher loss tangent for the grafted film in comparison to the pristine PVDF, the PVDF-g-PANI loss tangent was comparable to PVDF PANI nanohybrid films. It has been observed that the dielectric loss for the grafted film was almost independent of frequency. The dielectric loss was higher than the pristine PVDF polymers and resulted from the conductivity caused by the network of long PANI chains as well as some possible impurities left in the sample. The loss tangent for PVDF-g-PANI film was also found to increase with percentage of grafting (FIG. 10(b)). This is a result of increase in conductivity caused by the connection of long conductive chains of PANI.

Other factors such as greater fraction of the amorphous component as well as less molecular orientation; disruption of packing of rigid chain polymers; higher free volume as a result of incorporation of bulky polyaniline chains with increase in grafting percentage also contributed to the high dielectric loss.

Figure 11:
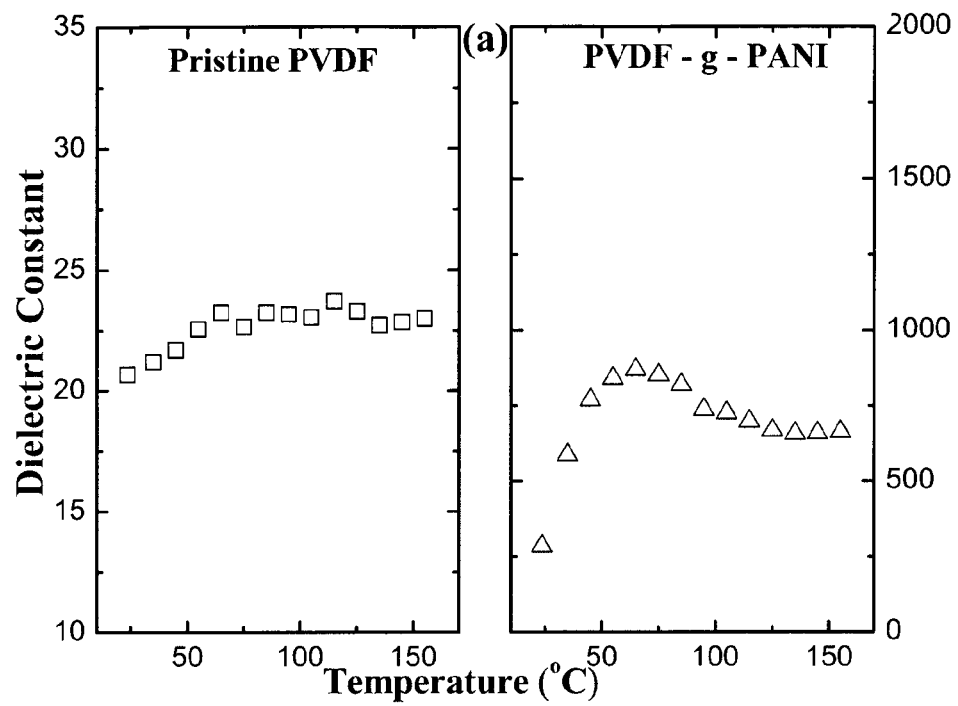
FIG. 11 are graphs showing (A) dependence of the dielectric constant of pristine PVDF and PVDF-g-PANI on temperature at the frequency 10 KHz; and (B) dependence of the dielectric losses of pristine PVDF and PVDF-g-PANI on temperature at the frequency 10 KHz.
Figure 11:
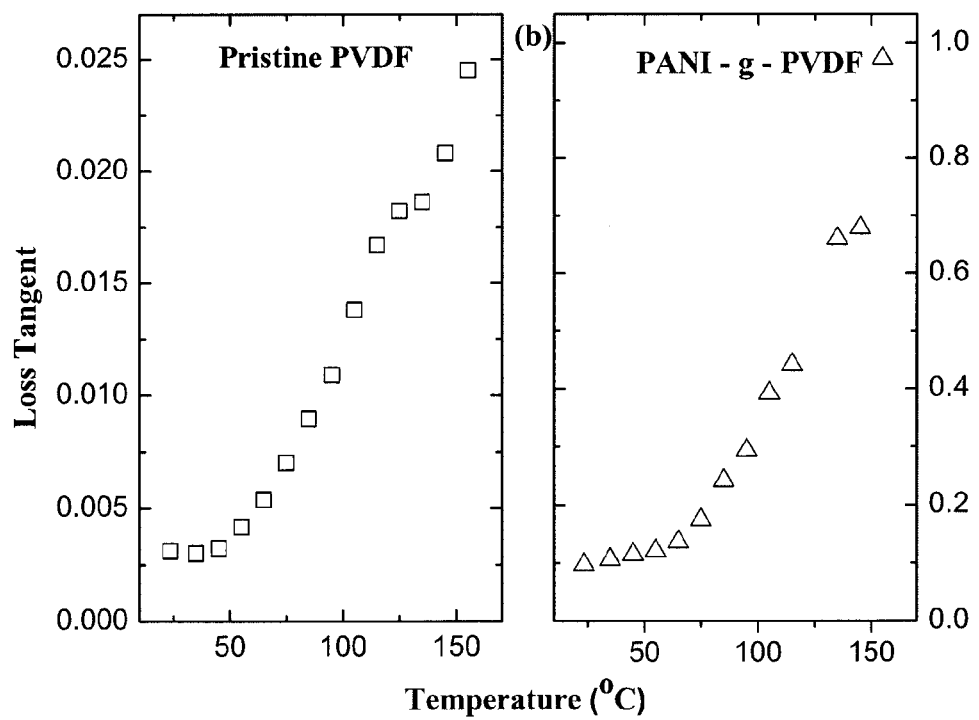

FIGS. 11(a) and (b) shows the temperature dependence of dielectric permittivity and dielectric loss for PVDF and PVDF-g-PANI copolymer films. A broad peak may be readily seen at about 70° C. for the grafted film with optimized grafting, most probably due to the coupled chains of polyaniline. At high temperatures (>70° C.), the motion of PVDF-g-PANI molecule chains were thermally activated, thereby disrupting the conducting polyaniline network, and hence, the nanocapacitors structure which led to a reduced dielectric constant. For the dielectric loss, it generally increased with elevated temperature as expected. Such a high dielectric loss as compared to pristine PVDF was primarily caused by the conductive polyaniline films. In fact, for both the pristine PVDF and PVDF-g-PANI films, the dielectric loss was also governed by the heterogeneity and motion of molecular chains. Since the motion of molecule chains was temperature-activated, it manifested itself by an increase in dielectric loss with temperature.

Figure 13:
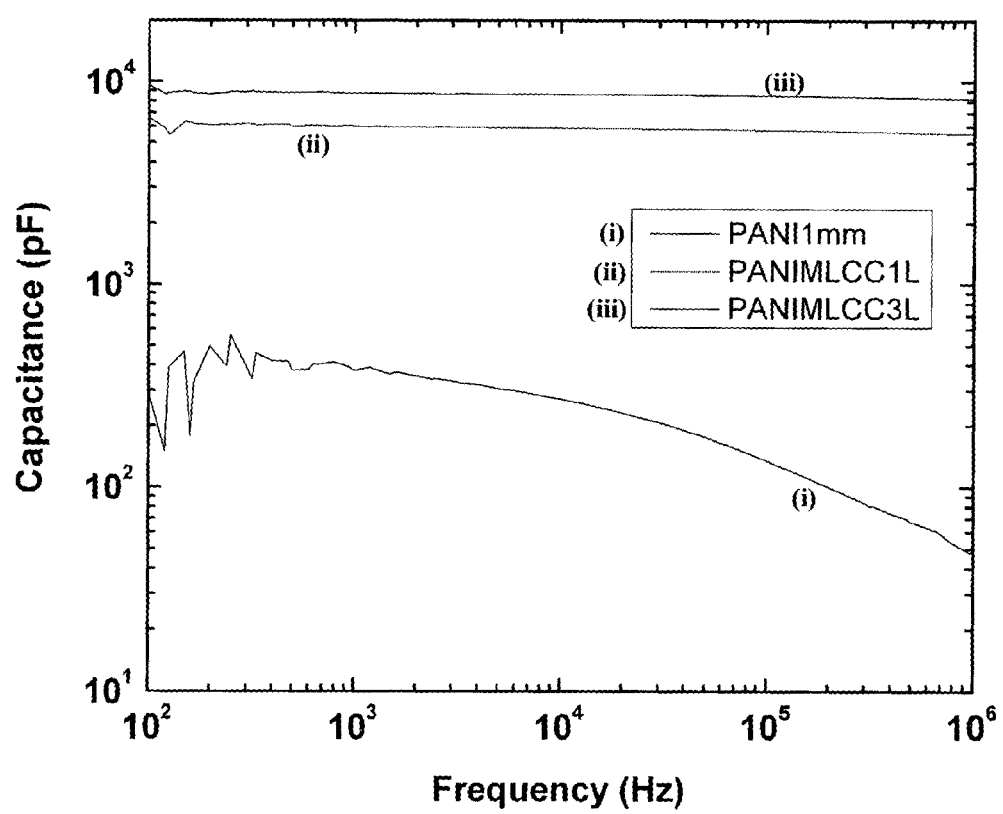
FIG. 13 is a graph showing dependences of capacitance of PANI-g-PVDF Multilayer Polymer (MLP) Capacitor on frequency measured at room temperature from $10^2$ to $10^6$ Hz.

FIG. 12 shows the schematic of the Multi Layer Polymer (MLP) capacitor. The 1 and 3 layer MLP showed a proportional increase in the capacitance with the increase in area compared to the standard 1 mm diameter electrode samples. Note that the dielectric results reported so far are of the standard 1 mm diameter electrode samples. For the 1 layer MLP, the capacitance was found to be 5991 pF, which was approximately 16 times the capacitance of the 1 mm electrode device (375 pF). This is close to the theoretical value of 13 times (Total area of 1 layer MLP (10 mm$^2$) Area of 1 mm electrode device (0.79 mm$^2$). Similarly, for the 3 layer MLP, the capacitance was found to be 8.7 nF, which was approximately 23 times the capacitance of the 1 mm electrode device which was close to the theoretical value of 25 times (Total area of 3 layer MLP (20 mm$^2$) Area of 1 mm electrode device (0.79 mm$^2$). The result is shown in FIG. 13.

Example 10.3: Calculation of Maximum Energy Density

To have a maximum energy density, the grafting should be optimized in a film in such a way that the combination of the effective permittivity and the breakdown strength gives the maximum value of energy density. The energy density of the grafted film was measured by the standard polarization method. The PVDF-g-PANI films showed promising energy density of 3.7 J cm$^3$ at 1000 V. Therefore, based on high dielectric permittivity and breakdown strength, the PVDF-g-PANI hybrid films with optimum grafting (11.35%) afforded large energy density. This value may be much higher depending on the applied electric field across the capacitors. The values of the energy density were greater than the current state of the art BaTiO$_3$ high-energy-density capacitors (3.5-4 J/cm$^3$) at the same applied voltage.

Example 10.4: Charge and Discharge Time for Grafted Polymer

Figure 14:
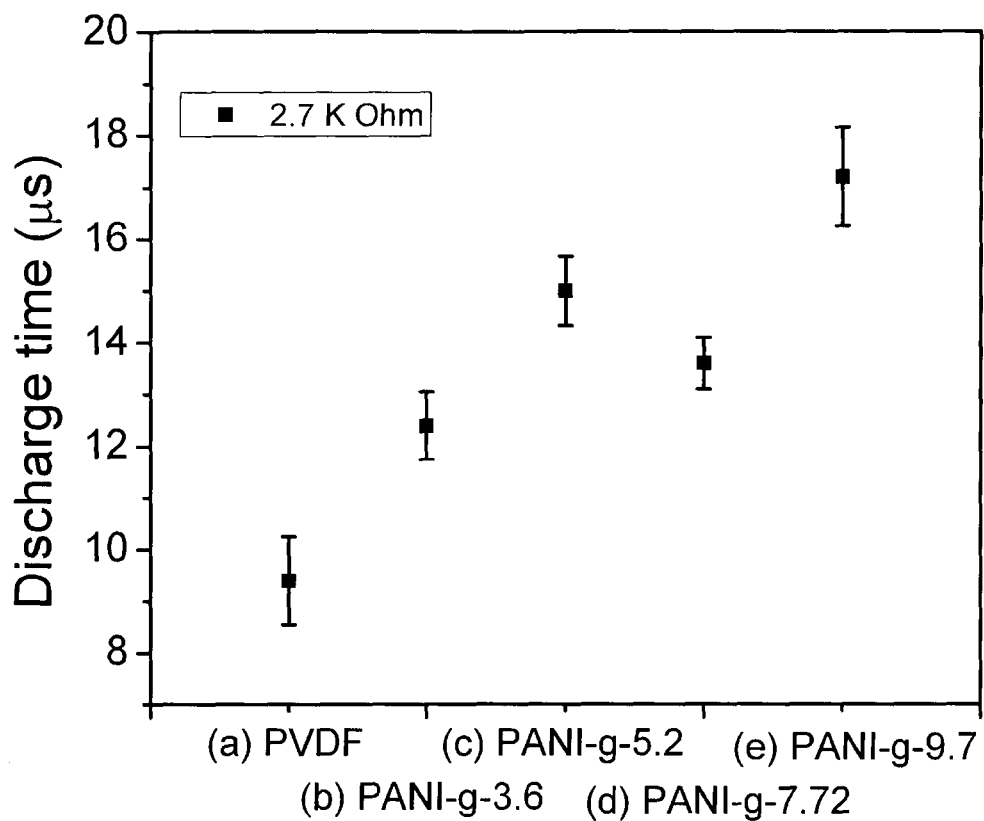
FIG. 14 is a graph showing discharge time comparison for various polymer samples measured at a circuit resistance of 2.7 KO, a) PVDF, b) PANI-g-PVDF 3.6%, c) PANI-g-PVDF 5.2%, d) PANI-g-PVDF 7.72% e) PANI-g-PVDF 9.7%.

FIG. 14 shows the discharge time against the various percentage of grafting polyaniline onto the PVDF measured at 2.7 KΩ. The discharge time increased slightly with increasing percentage of grafting polyaniline onto the PVDF. Compared to the pure PVDF and grafted PVDF films, the discharge time was in the range of 12-17 μs, close to the pristine PVDF (9.4 μs).

In brief, the graft copolymerization of polyaniline onto the pristine PVDF had an imperative effect on the dielectric properties of the PVDF-g-PANI films. At optimum grafting (11.35%), there was a significant increase in the effective dielectric permittivity.

The trends for the permittivity and tangent loss over the optimum grafting studied were reasonably well described by accounting for nanocapacitors formation and enhanced conductivity due to more formation of PANI elongated and connected domains within the grafted network as a result of more incorporation of PANI grafts under grafting conditions indicating that the grafting of PANI was responsible for the enhanced dielectric properties in the PVDF-g PANI films.

Grafting of polyaniline onto ferroelectric PVDF polymer films by free radical induced graft copolymerization has been demonstrated. Methods demonstrated herein are applicable for many polymer/monomer combinations and unlike chemically initiated grafting; there was no contamination form initiators.

Figure 9:
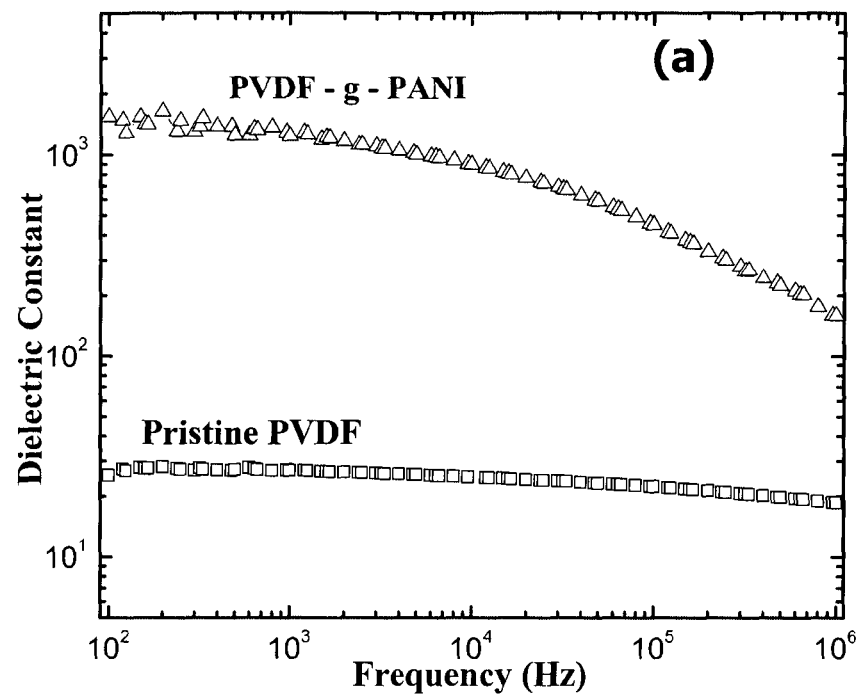
FIG. 9 are graphs showing (A) dependence of the dielectric constant of pristine PVDF and PVDF-g-PANI (with optimum grafting) on the frequency at room temperature; and (B) effect of the percentage of grafting of polyaniline onto the dielectric constant of PVDF at room temperature measured at 1 KHz.
Figure 9:
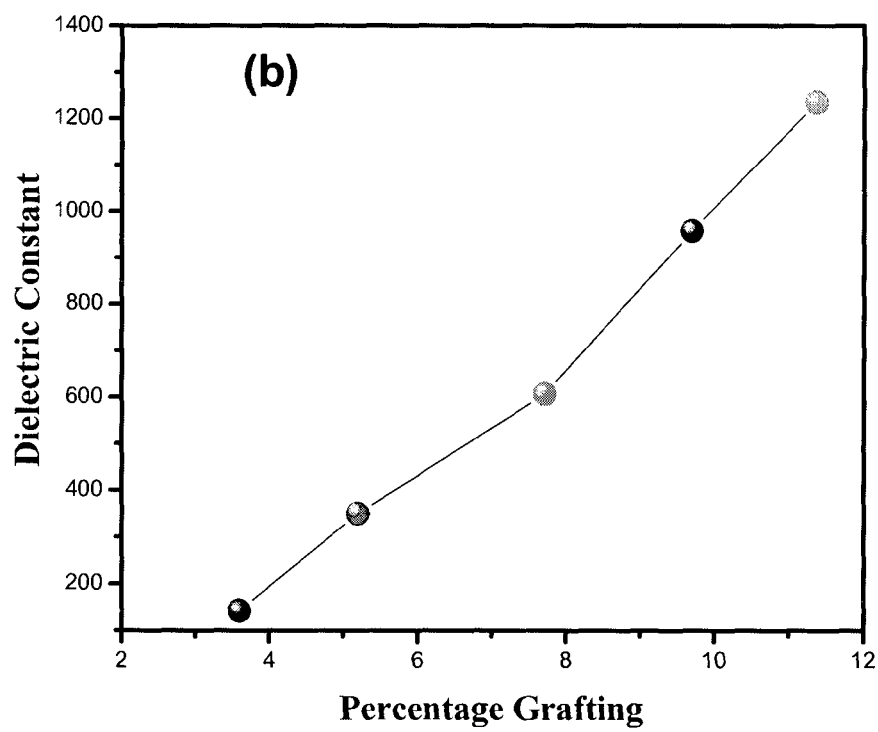
Figure 10:
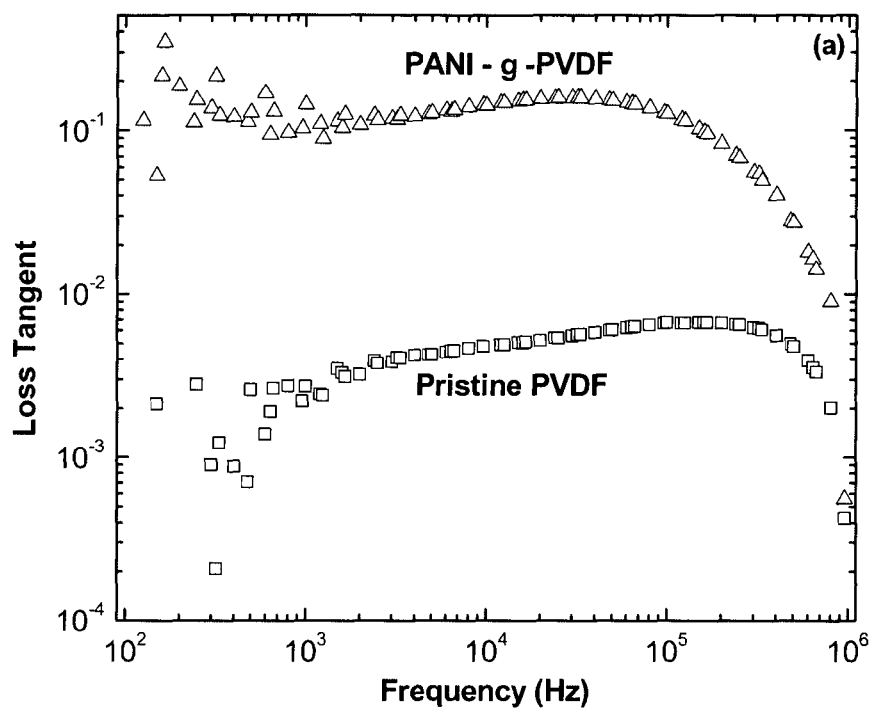
FIG. 10 are graphs showing (A) dependence of dielectric losses on the frequency at room temperature; (B) effect of the percentage of grafting of polyaniline onto the dielectric losses of PVDF at room temperature measured at 1 KHz.
Figure 10:
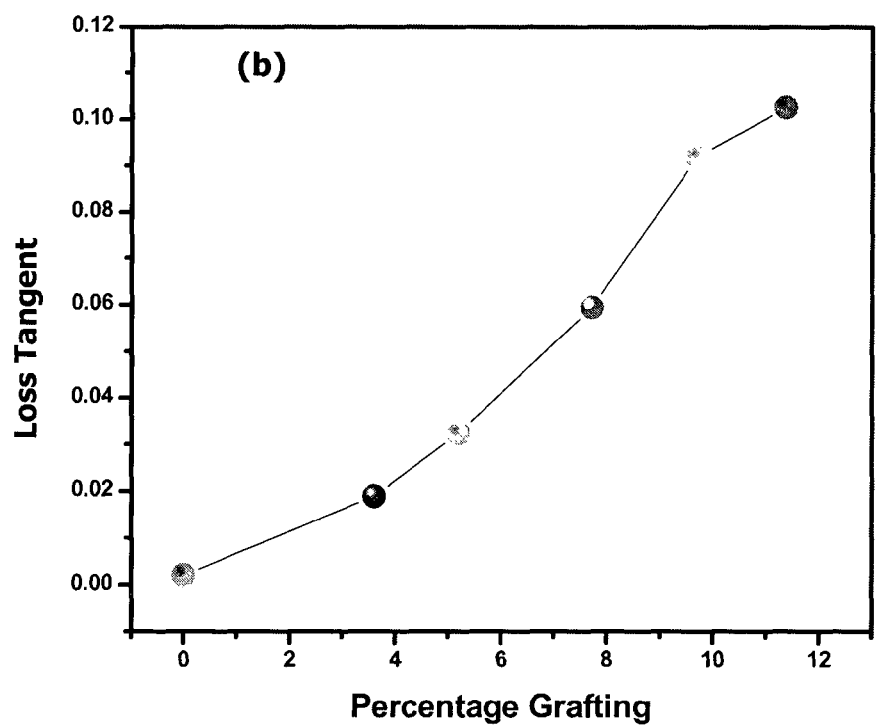

The PVDF and PVDF-g-PANI copolymer films have been prepared by tape casting method. The electrical and dielectric properties of the grafted films have been investigated. The dielectric constant obtained in the PVDF-g-PANI copolymer was much higher than that in other polymer system reported so far. The dielectric constant of 1235 (at $10^3$ Hz) was obtained in the copolymer films with 11.35% grafting with dielectric loss of 0.12. The results of electrical properties are shown in FIGS. 9 and 10.

It may be concluded that the high dielectric constant followed by reduced loss tangent field of graft copolymer observed in the copolymer films is partially caused by the nanocapacitors formation and good compatibility between the two polymer systems. The particular interest in grafted films lies due to high dielectric constant and low loss, which makes these films well suitable for possible application in high energy density capacitors. The success of such efforts, as well as development of approaches to mitigate dielectric breakdown in grafted polymer materials, could pave the way to wide ranging applications that take advantage of the energy storage potential and processability of conducting polymer grafted ferroelectric polymer systems.

In addition, the multilayer polymer capacitor has been demonstrated by PVDF-graft-polyaniline. The multilayer capacitor fabricated from PVDF-g-PANI also shows the promising properties. It is believed that more studies will be accomplished and remarkable performance improvements will be achieved with the development of decent syntheses and proper device fabrications.

The invention claimed is:

1. A method for forming a graft copolymer of a poly(vinylidene fluoride)-based polymer and at least one type of electrically conductive polymer, wherein the electrically conductive polymer is grafted on the poly(vinylidene fluoride)-based polymer, the method comprising the following steps a) through c) in sequential order:
    a) irradiating a poly(vinylidene fluoride)-based polymer with a stream of electrically charged particles;
    b) forming a solution comprising the irradiated poly(vinylidene fluoride)-based polymer, an electrically conductive monomer and an acid in a suitable solvent; and
    c) adding an oxidant to the solution to form the graft copolymer.

2. The method according to claim 1, wherein the electrically charged particles are electrons.

3. The method according to claim 1, further comprising exposing the irradiated poly(vinylidene fluoride)-based polymer to oxygen prior to step (b) to allow formation of peroxides and/or hydroperoxides on a surface of the polymer.

4. The method according to claim 3, wherein exposing the irradiated poly(vinylidene fluoride)-based polymer to oxygen comprises placing the irradiated poly(vinylidene fluoride)-based polymer under atmospheric conditions for a time period of at least 30 minutes.

5. The method according to claim 1, wherein the poly(vinylidene fluoride)-based polymer is selected from the group consisting of poly(vinylidene fluoride) (PVDF), poly(vinylidenefluoride-co-trifluoroethylene) (PVDF-TrFE), poly(vinylidene) flouride-hexafluoropropylene (PVDF-HEP), poly(vinylidene fluoride-chlorotrifluoroethylene) (PVDF-CTFE), poly(vinylidene fluoride-trifluoroethylene-chlorofluoroethylene) (PVDF-TrFE-CFE), derivatives thereof, and mixtures thereof.

6. The method according to claim 5, wherein the poly(vinylidene fluoride)-based polymer comprises poly(vinylidene fluoride).

7. The method according to claim 1, wherein the electrically conductive monomer is selected from the group consisting of aniline, pyrrole, thiophene, bisthiophene, furan, para-phenylene, phenylene vinylene, para-phenylene sulfide, thienylene-vinylene, acetylene, indole, carbazole, imidazole, pyridine, pyrene, azulene, naphthalene, derivatives thereof, and mixtures thereof.

8. The method according to claim 7, wherein the electrically conductive monomer comprises aniline.

9. The method according to claim 1, wherein the acid is selected from the group consisting of hydrochloric acid, sulfuric acid, dodecylbenzenesulfonic acid, naphthalene-2-sulfonic acid, poly(4-syyrenesufonic acid), and mixtures thereof.

10. The method according to claim 1, wherein the oxidant is selected from the group consisting of ammonium peroxydisulfate (APS), potassium biiodate ($KH(IO_3)_2$), iron (III) chloride, and mixtures thereof.

11. The method according to claim 1, wherein adding the oxidant to the solution comprises dripping the oxidant in a drop wise fashion into the solution.

12. The method according to claim 1, further comprising blowing air into the solution after step c) to quench the polymerization reaction.

13. A method of forming a multilayer capacitor, the method comprising
    a) coating a layer of a first metal on at least a portion of one surface of a nanocomposite material comprising a graft copolymer formed by the method of claim 1, the graft copolymer being of a poly(vinylidene fluoride)-based polymer and at least one type of electrically conductive polymer, wherein the electrically conductive polymer is grafted on the poly(vinylidene fluoride)-based polymer;
    (b) arranging a plurality of the metal-coated nanocomposite material formed in (a) in a stack such that the metal-coated surfaces do not contact each other but face the same direction; and
    (c) coating a layer of a second metal on at least a portion of each of two external surfaces of the stack opposing each other and lateral to the external surface of the stack with the layers of first metal coated thereon to form the multilayer capacitor.

14. The method according to claim 13, wherein the plurality of metal-coated nanocomposite materials comprises three or more metal-coated nanocomposite materials.

15. The method according to claim 13, wherein the first metal is selected from the group consisting of platinum, silver, gold, aluminium, nickel, copper, and alloys thereof.

* * * * *